United States Patent
Takami et al.

(10) Patent No.: US 7,169,319 B2
(45) Date of Patent: *Jan. 30, 2007

(54) ANISOTROPIC, SINTERED FERRITE MAGNET AND METHOD FOR PRODUCING THE SAME

(75) Inventors: Takashi Takami, Saitama-ken (JP); Yutaka Kubota, Saitama-ken (JP); Yasunobu Ogata, Saitama-ken (JP)

(73) Assignee: Neomax Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/963,832

(22) Filed: Oct. 14, 2004

(65) Prior Publication Data

US 2005/0098761 A1    May 12, 2005

Related U.S. Application Data

(60) Continuation of application No. 10/345,220, filed on Jan. 16, 2003, now Pat. No. 6,858,156, which is a division of application No. 09/380,032, filed as application No. PCT/JP98/05970 on Dec. 25, 1998, now Pat. No. 6,737,011.

(30) Foreign Application Priority Data

| Dec. 25, 1997 | (JP) | 9-358552 |
| Mar. 23, 1998 | (JP) | 10-73998 |
| Jun. 24, 1998 | (JP) | 10-193662 |
| Nov. 10, 1998 | (JP) | 10-318466 |
| Nov. 24, 1998 | (JP) | 10-332498 |

(51) Int. Cl.
*H01F 1/00* (2006.01)
*C04B 35/40* (2006.01)
*C04B 35/64* (2006.01)

(52) U.S. Cl. ............... 252/62.57; 252/62.63; 264/428; 264/611; 264/658

(58) Field of Classification Search ........... 264/428; 252/62.63, 62.57
See application file for complete search history.

(56) References Cited

U.S. PATENT DOCUMENTS 4,765,920 A    8/1988   Gattuso et al.

(Continued)

FOREIGN PATENT DOCUMENTS

EP    0 353 627 A2    2/1990

(Continued)

OTHER PUBLICATIONS

Osamu Kimura et al.; Enhanced Dispersion Frequency of Hot-Pressed Z-Type Magnetoplumbite Ferrite with the Composition $2CoO \cdot cBa_{0.5}Sr_{0.5}O \cdot 10.8Fe_2O_3$; J. AM. Ceramic Society, vol. 78(10), 1995, pp. 2857-2860, XP002271908.

(Continued)

*Primary Examiner*—C. Melissa Koslow
(74) *Attorney, Agent, or Firm*—Sughrue Mion, PLLC

(57) ABSTRACT

A ferrite magnet having a basic composition represented by the following general formula: $(A_{1-x}R_x)O \cdot n[(Fe_{1-y}M_y)_2O_3]$ by atomic ratio, wherein A is Sr and/or Ba, R is at least one of rare earth elements including Y, M is at least one element selected from the group consisting of Co, Mn, Ni and Zn, and x, y and n are numbers meeting the conditions of $0.01 \leq x \leq 0.4$, $[x/(2.6n)] \leq y \leq [x/(1.6n)]$, and $5 \leq n \leq 6$, and substantially having a magnetoplumbite-type crystal structure, is obtained by uniformly mixing a compound of Sr and/or Ba with an iron compound; calcining the resultant uniform mixture; adding a compound of the R element and/or the M element to the resultant calcined powder at a pulverization step thereof; and sintering the resultant mixture. The compound of the R element and/or the M element may be added at a percentage of more than 0 atomic % and 80 atomic % or less, on an element basis, at a mixing step before calcination.

4 Claims, 14 Drawing Sheets

U.S. PATENT DOCUMENTS

| | | | |
|---|---|---|---|
| 5,846,449 A | | 12/1998 | Taguchi et al. |
| 5,951,937 A | * | 9/1999 | Taguchi et al. ............. 264/427 |
| 5,958,284 A | * | 9/1999 | Takami et al. ........... 252/62.63 |
| 6,086,781 A | * | 7/2000 | Taguchi et al. .......... 252/62.57 |
| 6,258,290 B1 | | 7/2001 | Taguchi et al. |
| 6,737,011 B1 | * | 5/2004 | Takami et al. .............. 264/611 |
| 6,858,156 B2 | * | 2/2005 | Takami et al. ........... 252/62.63 |

FOREIGN PATENT DOCUMENTS

| | | |
|---|---|---|
| EP | 3 377 821 A1 | 7/1990 |
| EP | 0 758 786 A1 | 2/1997 |
| JP | 62-252325 | 4/1987 |
| JP | 62-119760 | 6/1987 |
| JP | 5-275221 | 10/1993 |
| JP | 09-115715 | 2/1997 |
| WO | WO 98/38654 | 3/1998 |
| WO | WO 09/16087 | 1/1999 |

OTHER PUBLICATIONS

"Synthesis and Characterization of Ferrate with Magnetplumbite Structure", H. Nakai et al.; presented in 1992 Annual Meeting of The Japan Ceramics Association held on May 20, 1992; The Collected Preliminary Papers Presented in 1992 Annual Meeting of The Japan Ceramics Association, p. 95(1992) (English translation thereof attached hereto).

"Invention of Ferrimagnets with the Structure of Magnetoplumbite and Garnet in Strong Pulse Magnetic Fields", G.A. Smolenskii et al., Bulletin of the Academy of Sciences of the USSR (Physical Series), vol. 25, No. 11, pp. 1405-1408 (1961) (English translation of the corresponding paper appeared in "Izvestiya Akdemii Nauk USSR, Seriya fizicheskaya").

* cited by examiner

ANISOTROPIC, SINTERED FERRITE MAGNET AND METHOD FOR PRODUCING THE SAME

This is a continuation of Application Ser. No. 10/345,220 filed Jan. 16, 2003, now U.S. Pat. No. 6,858,156, which in turn is a divisional of application Ser. No. 09/380,032 filed Nov. 9, 1999, as Application No. PCT/JP98/05970 filed on Dec. 25, 1998, now U.S. Pat. No. 6,737,011, the disclosure of which is incorporated herein by reference.

FIELD OF THE INVENTION

The present invention relates to a high-performance ferrite magnet having substantially a magnetoplumbite crystal structure extremely useful for wide ranges of magnet applications such as rotors for automobiles or electric apparatuses, magnet rolls for photocopiers, etc., particularly to a high-performance ferrite magnet having a microstructure having a higher coercivity iHc (or higher coercivity iHc and residual magnetic flux density Br) than those of the conventional ferrite magnets and optionally a high squareness ratio Hk/iHc, and a method for producing such a high-performance ferrite magnet.

BACKGROUND OF THE INVENTION

Ferrite magnets are widely used in various applications including rotors of motors, electric generators, etc. Recently, ferrite magnets having higher magnetic properties are required particularly for the purposes of miniaturization and reduction in weight in the field of rotors for automobiles and increase in performance in the field of rotors for electric apparatuses.

High-performance sintered magnets such as Sr ferrite or Ba ferrite are conventionally produced through the following processes. First, iron oxide is mixed with a carbonate, etc. of Sr or Ba and then calcined to cause a ferritization reaction (ferrite-forming reaction). The resultant calcined clinker is coarsely pulverized, mixed with $SiO_2$, $SrCO_3$, $CaCO_3$, etc. for controlling sintering behavior and $Al_2O_3$, $Cr_2O_3$, etc. for controlling iHc, and then finely pulverized to an average diameter of 0.7–1.2 μm in a solvent. A slurry containing the finely pulverized ferrite-forming material is wet-molded while being oriented in a magnetic field. The resultant green body is dried, sintered and then machined to a desired shape. To increase the properties of the ferrite magnets produced by such a method, there are the following five methods available.

The first method is a fine pulverization method. When the size of crystal grains in the sintered body is close to about 0.9 μm, a critical single magnetic domain diameter of a magnetoplumbite (M)-type Sr ferrite magnet, its iHc is maximum. Accordingly, fine pulverization may be carried out to an average diameter of 0.7 μm or less, for instance, taking into consideration the crystal grain growth at the time of sintering. This method is, however, disadvantageous in that finer pulverization leads to poorer water removal at the time of wet molding, resulting in poorer production efficiency.

The second method is to make the sizes of the crystal grains in the sintered body as uniform as possible. Ideally, the sizes of the crystal grains are made as uniformly as possible equal to the above critical single magnetic domain diameter (about 0.9 μm), because crystal grains larger than or smaller than this size have low iHc. Specific means for achieving high performance in this method is to improve a particle size distribution of fine powder. In commercial production, however, other pulverization apparatuses than ball mills, attritors, etc. cannot be used, naturally posing limitations in the level of improvement in magnetic properties by fine pulverization. Also, an attempt was recently published to produce fine ferrite powder having a uniform particle size by a chemical precipitation method. Such method is, however, not suitable for industrial mass production.

The third method is to improve crystal orientation affecting magnetic anisotropy. Specific means in this method is to improve the dispersion of ferrite particles in a fine powder slurry by adding a surfactant, or to increase the intensity of a magnetic field at the time of orientation, etc.

The fourth method is to improve the density of a sintered body. A Sr ferrite sintered body has a theoretical density of 5.15 g/cc. Sr ferrite magnets commercially available at present have densities ranging from 4.9 g/cc to 5.0 g/cc, corresponding to 95–97% of the theoretical density. Though improvement in Br is expected by increasing the density of a ferrite magnet, a higher density than the above level needs such density-increasing means as HIP, etc. However, the use of such density-increasing means leads to increase in the production cost of ferrite magnets, depriving the ferrite magnets of advantages as inexpensive magnets.

The fifth method is to improve a saturation magnetization as or a crystal magnetic anisotropy constant of a ferrite compound per se, which is a main component (main phase) of the ferrite magnet. It is likely that the improvement in the saturation magnetization σs directly leads to improvement in the residual magnetic flux density Br of the ferrite magnet. It is also likely that the improvement in the crystal magnetic anisotropy constant leads to improvement in the coercivity iHc of the ferrite magnet. Though research is being carried out on W-type ferrite having a higher saturation magnetization than that of the conventional ferrite compound having an M-type crystal structure, the W-type ferrite has not been subjected to mass production because of difficulty in the control of a sintering atmosphere.

Widely used at present among the above methods for improving the properties of ferrite magnets are the first to fourth methods, though it is difficult to drastically improve the properties of ferrite having a main phase expressed by $SrO \cdot nFe_2O_3$ by the first to fourth methods for the reasons described below. The first reason is that the above first to fourth methods include conditions lowering productivity or steps difficult to carry out from the aspect of mass production. The second reason is that further improvement in magnetic properties, particularly Br, is extremely difficult because they are close to the theoretically highest level.

Next, as a result of investigation of a hexagonal magnetoplumbite sintered ferrite magnet described in Japanese Patent Laid-Open No. 9-115715, it has been found that higher iHc cannot easily be achieved.

It may be considered as a specific means for the above fifth method to mix ferrite expressed by $AO \cdot nFe_2O_3$, wherein A is Sr and/or Ba, with other types of metal compounds such as metal oxides to replace part of A and Fe elements in the ferrite with other elements thereby improving the magnetic properties of the ferrite.

The magnetism of the magnetoplumbite ferrite magnet is derived from a magnetic moment of Fe ions, with a magnetic structure of a ferri-magnet in which magnetic moment is arranged partially in antiparallel by Fe ion sites. There are two methods to improve the saturation magnetization in this magnetic structure. The first method is to replace the Fe ions at sites corresponding to the antiparallel-oriented magnetic moment with another element, which has a smaller magnetic moment than Fe ions or is non-magnetic. The second method is to replace the Fe ions at sites corresponding to the parallel-oriented magnetic moment with another element having a larger magnetic moment than Fe ions.

Also, increase in a crystal magnetic anisotropy constant in the above magnetic structure can be achieved by replacing Fe ions with another element having a stronger interaction with the crystal lattice. Specifically, Fe ions are replaced with an element in which a magnetic moment derived from an orbital angular momentum remains or is large.

With the above findings in mind, research has been conducted for the purpose of replacing Fe ions with various elements by adding various metal compounds such as metal oxides. As a result, it has been found that Mn, Co and Ni are elements remarkably improving magnetic properties. However, the mere addition of the above elements would not provide ferrite magnets with fully improved magnetic properties, because the replacement of Fe ions with other elements would destroy the balance of ion valance, resulting in the generation of undesirable phases. To avoid this phenomenon, ion sites of Sr and/or Ba should be replaced with other elements for the purpose of charge compensation. For this purpose, the addition of La, Nd, Pr, Ce, etc. is effective, resulting in magnetoplumbite ferrite magnets having high Br or high Br and coercivity.

When compounds of rare earth elements such as La and compounds of M elements such as Co are added to produce high-performance ferrite magnets by the fifth method, it is usual to carry out the addition of such compounds before the calcination, namely before the ferritization reaction. Such addition method is called herein "prior-addition method." Though the ferrite magnets formed by the prior-addition method have high Br and high iHc, the squareness ratio Hk/iHc tends to remarkably decrease as the amounts of these elements added increase, particularly when R is La and M is Co. The tendency of decrease in the squareness ratio Hk/iHc by the prior-addition method is also appreciated in the case of R=La, M=Co+Zn, or M=Co+Mn. Because the critical demagnetizing field intensity decreases by decrease in the squareness ratio Hk/iHc, the ferrite magnets are likely to lose its magnetization. How easily the ferrite magnets lose their magnetization is critical particularly when the ferrite magnets are assembled in magnetic circuits for rotors, etc. Ferrite magnets with higher squareness ratio Hk/iHc are thus desired.

Therefore, high-performance ferrite magnets satisfactory both in a coercivity iHc (or coercivity iHc and residual magnetic flux density Br) and in a squareness ratio Hk/iHc are desired.

Accordingly, an object of the present invention is to provide a high-performance ferrite magnet having substantially a magnetoplumbite crystal structure, which has higher coercivity iHc (or higher coercivity iHc and residual magnetic flux density Br) than those of conventional ferrite magnets and also has high squareness ratio Hk/iHc, thus useful in wide varieties of magnet applications such as rotors for automobiles and electric appliances, magnet rolls for photocopiers, etc., and a method for producing such a high-performance ferrite magnet.

Another object of the present invention is to provide a high-performance ferrite magnet having substantially a magnetoplumbite crystal structure, which has higher coercivity iHc (or higher coercivity iHc and residual magnetic flux density Br) and higher squareness ratio Hk/iHc than those of conventional ferrite magnets, and also has a microstructure in which the concentration of an R element is high in crystal grain boundaries, and a method for producing such a high-performance ferrite magnet.

DESCRIPTION OF THE INVENTION

As a result of intense research in view of the above objects, the inventors have found that the addition of an R element and an M element by a post-addition method or a prior/post-addition method to ferrite having a basic composition represented by $(A_{1-x}R_x)O \cdot n[(Fe_{1-y}M_y)_2O_3]$, wherein A is Sr and/or Ba, R is at least one of rare earth elements including Y, and M is at least one element selected from the group consisting of Co, Mn, Ni and Zn can turn the ferrite to a higher-performance ferrite substantially having a magnetoplumbite crystal structure with a higher squareness ratio Hk/iHc and a reduced variation of shrink ratio, while keeping good coercivity iHc (or good coercivity iHc and residual magnetic flux density Br). The present invention has been completed based upon this finding.

Thus, the ferrite magnet according to the first embodiment of the present invention has a basic composition represented by the following general formula:

$(A_{1-x}R_x)O \cdot n[(Fe_{1-y}M_y)_2O_3]$ by atomic ratio, wherein A is Sr and/or Ba, R is at least one of rare earth elements including Y, M is at least one element selected from the group consisting of Co, Mn, Ni and Zn, and x, y and n are numbers meeting the following conditions:

$0.01 \leq x \leq 0.4$,

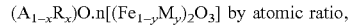
$[x/(2.6n)] \leq y \leq [x/(1.6n)]$, and $5 \leq n \leq 6$, and has a substantially magnetoplumbite crystal structure, the R element and/or the M element being added in the form of a compound at a pulverization step after calcination.

The ferrite magnet according to the second embodiment of the present invention has a basic composition represented by the following general formula:

$(A_{1-x}R_x)O \cdot n[(Fe_{1-y}M_y)_2O_3]$ by atomic ratio, wherein A is Sr and/or Ba, R is at least one of rare earth elements including Y, M is at least one element selected from the group consisting of Co, Mn, Ni and Zn, and x, y and n are numbers meeting the following conditions:

$0.01 \leq x \leq 0.4$,

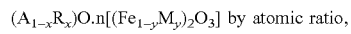
$[x/(2.6n)] \leq y \leq [x/(1.6n)]$, and $5 \leq n \leq 6$, and has a substantially magnetoplumbite crystal structure, the R element and/or the M element being added in the form of a compound both at a mixing step before calcination and at a pulverization step after calcination.

In both cases, the concentration of the R element is preferably higher in boundaries than in the magnetoplumbite crystal grains. When the R element is La and the M element is Co, the ferrite magnet has a residual magnetic flux density Br of 4,100 G or more, a coercivity iHc of 4,000 Oe or more and a squareness ratio Hk/iHc of 92.3% or more at 20° C. Also, when the R element is La and the M element is Co plus Mn and/or Zn, the ferrite magnet has a residual magnetic flux density Br of 4,200 G or more, a coercivity iHc of 3,000 Oe or more and a squareness ratio Hk/iHc of 93.5% or more at 20° C.

The method for producing a ferrite magnet according to the first embodiment of the present invention, the ferrite magnet having a basic composition represented by the following general formula:

$(A_{1-x}R_x)O \cdot n[(Fe_{1-y}M_y)_2O_3]$ by atomic ratio, wherein A is Sr and/or Ba, R is at least one of rare earth elements including Y, M is at least one element selected from the group consisting of Co, Mn, Ni and Zn, and x, y and n are numbers meeting the following conditions:

$0.01 \leq x \leq 0.4$, $[x/(2.6n)] \leq y \leq [x/(1.6n)]$, and $5 \leq n \leq 6$, and substantially having a magnetoplumbite crystal structure, the method comprising the steps of uniformly mixing a compound of Sr and/or Ba with an iron compound; calcining the resultant mixture; adding the R element and/or the M element in the form of a compound to the resultant calcined powder at a pulverization step thereof; and sintering the resultant mixture.

The method for producing a ferrite magnet according to the second embodiment of the present invention, the ferrite magnet having a basic composition represented by the following general formula:

$(A_{1-x}R_x)O \cdot n[(Fe_{1-y}M_y)_2O_3]$ by atomic ratio, wherein A is Sr and/or Ba, R is at least one of rare earth elements including Y, M is at least one element selected from the group consisting of Co, Mn, Ni and Zn, and x, y and n are numbers meeting the following conditions:

$0.01 \leq x \leq 0.4$, $[x/(2.6n)] \leq y \leq [x/(1.6n)]$, and $5 \leq n \leq 6$, and substantially having a magnetoplumbite-type crystal structure, the R element and/or the M element being added in the form of a compound both a mixing step before calcination and at a pulverization step after calcination.

In that embodiment, the amount of the R element and/or M element post-added is 20 atomic % or more and less than 100 atomic % per the toatal amount or the R element and/or the M element.

In a specific embodiment, the method comprises the steps of adding a compound of the R element and/or the M element at a percentage of more than 0 atomic % and 80 atomic % or less on an element basis at a step of uniformly mixing a compound of Sr and/or Ba with an iron compound; calcining the resultant uniform mixture; adding the remaining amount of the compound of the R element and/or the M element to the resultant calcined powder at a pulverization step thereof; and sintering the resultant mixture.

In both cases, added as the R element compound is preferably an oxide, a hydroxide, a carbonate or an organic acid salt of at least one element selected from the group consisting of La, Nd, Pr and Ce. Also, preferably added as the M element compound is an oxide, a hydroxide, a carbonate or an organic acid salt of at least one element selected from the group consisting of Co, Mn, Ni and Zn. It is also preferable to add only a Co compound as the M element compound.

In a case where a high-performance ferrite magnet is produced by the post-addition or prior/post-addition of the R element and the M element, the resultant ferrite magnet shows extremely suppressed tendency of decrease in a squareness ratio Hk/iHc as the amounts of the R element and the M element added (values of x and y) increase, as compared with the ferrite magnets obtained by the prior-addition method.

The post-addition or prior/post-addition of the R element and the M element may lead to the deterioration of Br and iHc and to variation in a shrinkage ratio of a sintered body. To prevent the deterioration of Br and iHc and the variation of a sintering shrinkage ratio, it is preferable to add an Fe compound at the time of pulverization after calcination, in such an amount as not to hinder the magnetic orientation of a green body along a magnetic field during a process of forming the green body. Specifically, the amount of the Fe compound post-added is preferably 0.1–11 weight % on an iron element basis, based on the total amount of Fe contained in the ferrite magnet.

It has been found that when the post-addition method is adopted, the amounts of the R element and the M element (values of x and y) increase, resulting in decrease in a molar ratio n, which in turn leads to the deterioration of Br and iHc. It has also been found that when the molar ratio n decreases, variations in the size of the resultant sintered body may take place. The mechanism of decrease in the molar ratio n is as follows: Investigation is conducted on the case of the production of a ferrite magnet by the post-addition method, in which calcined ferrite powder having a composition of $SrO \cdot 5.9Fe_2O_3$, namely $SrFe_{11.8}O_{18.7}$ (molar ratio n is 5.9), is used, and a La oxide is added in the course of fine pulverization to substitute about 20% of the Sr ion site with La. In this case, in order that the ferrite magnet contains substantially the same number of Co atoms as that of La atoms under charge compensation conditions, the corresponding amount of a Co oxide is simultaneously added. Assuming that all of Co added is contained as the M phase, the resultant ferrite sintered body has the following composition:

$Sr_{0.8}La_{0.2}Fe_{9.60}Co_{0.20}O_{15.7}$, namely $(Sr_{0.8}La_{0.2})O \cdot 4.9[(Fe_{0.98}Co_{0.02})_2O_3]$.

Thus, the molar ratio n decreases from 5.9 at the stage of a calcined powder to 4.9 by the post-addition of the La oxide and the Co oxide. When the molar ratio n becomes less than 5, the relative percentage of components corresponding to the Fe ion site bearing magnetism decreases, resulting in drastic decrease in magnetic properties. At the same time, the sintering shrinkage ratio indicating how much the size changes in the course from the green body to the sintered body drastically changes, resulting in large unevenness in the sizes of the resultant ferrite magnet products.

The molar ratio n of the calcined powder may be set large in advance, taking into consideration a decrease in the molar ratio n by the post-addition method. However, this means is not effective. Investigation will be made assuming that calcined powder having a composition of $SrO \cdot n_1Fe_2O_3$ is used, and that both a La oxide and a Co oxide are added at the time of fine pulverization to produce a high-performance ferrite magnet having the following basic composition:

$(Sr_{1-x}La_x)O \cdot n_2[(Fe_{1-y}Co_y)_2O_3]$ by atomic ratio, wherein $0.01 \leq x \leq 0.4$, and $x/(2.6n_2) \leq y \leq x/(1.6n_2)$. If the values of x and y were determined such that $n_1=6.5$, and $n_2=5.9$, the molar ratio $n_2$ of the resultant ferrite magnet would be 5.9, within a range (5–6) of the molar ratio n suitable for the ferrite magnet. However, the ferrite magnet shows extremely poor magnetic properties in this case. The reason therefor is that when the molar ratio n of the calcined powder is more than 6, undesirable phases such as $\alpha\text{-}Fe_2O_3$ other than the M phase appear in the calcined powder. Because the undesirable phases are non-magnetic phases, they reduce the magnetic orientation of a green body obtained by a wet-molding method in a magnetic field. Thus, when the molar ratio $n_1$ of the calcined powder exceeds 6, Br, a squareness ratio Hk/iHc, etc. drastically decrease, even if the molar ratio $n_2$ of a ferrite magnet obtained by the post-addition method is controlled within the range of 5–6.

Accordingly, it is preferable to add an iron compound such as iron oxide, etc. by a post-addition method, to set the molar ratio n of a sintered ferrite magnet obtained by the post-addition method and/or the prior/post-addition method within the desired range of 5–6 without excessively increasing the molar ratio n of the calcined powder. It is preferable that the calcined powder has a molar ratio of 5–6 before the post-addition.

In addition, the post-addition method or the prior/post-addition method is advantageous for the reason that it makes easy the mass production of ferrite magnets. This is because the calcined powder of Sr and/or Ba ferrite containing no or small amounts of R elements and M elements can be used in the post-addition method or the prior/post-addition method. More conveniently, by controlling the amounts of R elements and M elements at the fine pulverization step after calcination, it is made easy to produce ferrite magnets containing R elements and M elements whose amounts differ depending on fine pulverization lots, namely ferrite magnets having various magnetic properties.

THE BEST MODE FOR CONDUCTING THE INVENTION

[1] Ferrite Magnet

Figure 1:
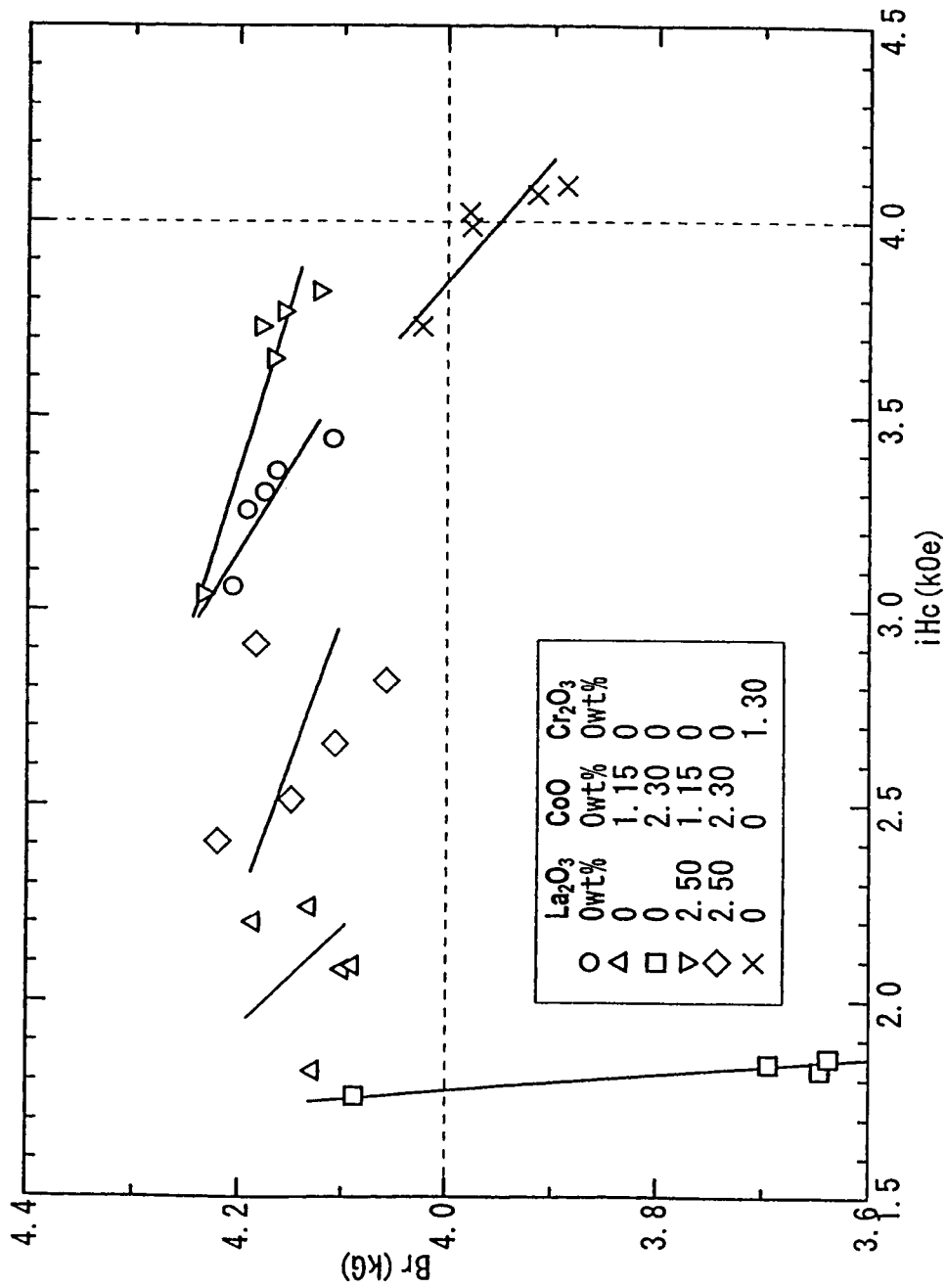
FIG. 1 is a graph showing the magnetic properties of the ferrite magnet in EXAMPLE 1.

The basic composition of the ferrite magnet to which the present invention is applicable is represented by the following general formula:

$(A_{1-x}R_x)O \cdot n[(Fe_{1-y}M_y)_2O_3]$ by atomic ratio, wherein A is Sr and/or Ba, R is at least one of rare earth elements including Y, M is at least one element selected from the group consisting of Co, Mn, Ni and Zn, and x, y and n are numbers meeting the following conditions:

$0.01 \leq x \leq 0.4$, $[x/(2.6n)] \leq y \leq [x/(1.6n)]$, and $5 \leq n \leq 6$.

To impart good magnetic properties to the ferrite magnet of the present invention, the value of n (molar ratio) should be between 5 and 6. When the value of n exceeds 6, undesirable phases such as $\alpha\text{-}Fe_2O_3$ other than the magnetoplumbite phase are generated, resulting in drastic decrease in magnetic properties. On the other hand, when the value of n is less than 5, Br of the ferrite magnet drastically decreases.

The value of x is between 0.01 and 0.4. When the value of x is less than 0.01, sufficient effects of the post-addition method or the prior/post-addition method cannot be obtained. On the other hand, when the value of x exceeds 0.4, the magnetic properties of the ferrite magnet rather decrease.

To investigate the permissible range of a ratio of the R element/the M element added in connection with charge compensation, Sr, La and Co were selected as the A element, the R element and the M element, respectively, and $SrCO_3$, $Fe_2O_3$, $La_2O_3$, and $Co_3O_4$ were formulated in such proportions as to provide the following basic composition:

$(Sr_{1-x}La_x)O \cdot n[(Fe_{1-y}Co_y)_2O_3]$ by atomic ratio, wherein x=0.15, y=0.77–2.08×10⁻², and n=6.0, wet-mixed, and then calcined at 1200° C. for 2 hours. The magnetic properties of the resultant coarse powder were measured. It has thus been found that there is no substantial deterioration in magnetic properties, as long as the ratio of x/ny is within the range of 1.6–2.6, not limited to the conditions under which the charge balance is fully kept, namely to a ratio of x to y satisfying the relation of y=x/2n. When the value of y deviates from x/(2.0n), there is likelihood that $Fe^{2+}$ is contained, though there are no problems. On the other hand, when the ratio of x/ny exceeds 2.6 or is less than 1.6, remarkable decrease in magnetic properties is appreciated.

Accordingly, the ratio of x/ny should be between 1.6 and 2.6. This condition may be converted to the formula of y as follows:

$$[x/(2.6n)] \leq y \leq [x/(1.6n)].$$

In typical example, the preferred range of y is 0.04 or less, particularly 0.005–0.03. Even when the contents of the R element and the M element meet the equation of y=x/(2.0n), part of the R element and/or the M element may be accumulated in high concentration in the vicinity of grain boundaries, without causing any problems.

In any of the post-addition method and the prior/post-addition method, the R element is preferably at least one selected from the group consisting of La, Nd, Pr and Ce. In one example of the ferrite magnets of the present invention, the percentage of La in R is preferably 50 atomic % or more, more preferably 70 atomic % or more, particularly preferably 99 atomic % or more to improve saturation magnetization thereof. The R element may be composed of La only.

In another example of the ferrite magnets of the present invention, the total percentage of Nd, Pr and/or Ce in R is preferably 50 atomic % or more, more preferably 70 atomic % or more, particularly preferably 99 atomic % or more to improve saturation magnetization thereof.

In a further example of the ferrite magnets of the present invention, the total percentage of one or more of La, Nd, Pr and Ce in R is preferably 50 atomic % or more, more preferably 70 atomic % or more, particularly preferably 99 atomic % or more to improve saturation magnetization thereof.

The M element is preferably composed of Co only, or Co plus Mn and/or Ni. Particularly to have higher Br and iHc than those of the conventional ferrite magnets, it is preferable to select Co plus Mn and/or Ni as M. The addition of Mn contributes to provide ferrite magnets with good magnetic properties, even when the R element is added in a smaller amount than the level that would be required by the charge compensation conditions but for Mn.

When Mn is contained, the content of Mn is preferably 0.4 atomic % or more, assuming that the total amount of Mn and the other M element is 100 atomic %. For instance, when M consists of Co and Mn, the content of Mn is preferably 0.4–75 atomic %, more preferably 0.7–60 atomic %, particularly preferably 1–50 atomic %, assuming that Co+Mn is 100 atomic %. When the content of Mn is less than 0.4 atomic %, improvement in Br by adding Mn cannot be appreciated. On the other hand, when the content of Mn exceeds 75 atomic %, iHc of the ferrite magnet drastically decreases.

Also, when Co+Mn+Ni (Zn) are selected as the M elements, the content of Mn is preferably 0.4–75 atomic %, more preferably 0.7–60 atomic %, particularly preferably 1–50 atomic %, assuming that the total amount of Co+Mn+Ni (Zn) is 100 atomic %.

Further, when M consists of Co and Ni, the percentage of Ni in M is preferably 10–75 atomic %, more preferably 10–60 atomic %, particularly preferably 10–50 atomic %, based on the total amount (100 atomic %) of the M elements, to have higher Br and iHc than those of the conventional ferrite magnets. When the percentage of Ni in M is less than 10 atomic %, remarkable improvement in Br cannot be obtained. On the other hand, when the percentage of Ni exceeds 75 atomic %, iHc of the ferrite magnet decreases drastically.

Further, when Mn and/or Ni is selected as M, the content of Mn is preferably 0.4–75 atomic %, more preferably 0.7–60 atomic %, particularly preferably 1–50 atomic %, based on the total amount (100 atomic %) of Mn+Ni, so that the ferrite magnet can have higher magnetic properties than those of the conventional ferrite magnets.

In one embodiment, only a Co compound is added as the M element compound.

The ferrite magnet obtained by the post-addition method or prior/post-addition method of the present invention substantially has a magnetoplumbite crystal structure. When the R element is La and the M element is Co, the ferrite magnet has a residual magnetic flux density Br of 4,100 G or more, a coercivity iHc of 4,000 Oe or more and a squareness ratio Hk/iHc of 92.3% or more at 20° C. Also, when the R element is La and the M element is Co plus Mn and/or Zn, the ferrite magnet has a residual magnetic flux density Br of 4,200 G or more, a coercivity iHc of 3,000 Oe or more and a squareness ratio Hk/iHc of 93.5% or more at 20° C.

The Hk used herein, which is a parameter measured to obtain the squareness ratio, is a value on the H axis in a graph of a $4\pi I$-H curve, wherein $4\pi I$ represents the intensity of magnetization and H represents the intensity of a magnetic field, at a position in the second quadrant where $4\pi I$ is 0.95 Br. The squareness ratio is defined as a value of Hk/iHc obtained by dividing Hk by iHc in the above demagnetization curve.

In the ferrite magnet of the present invention, the M element is sufficiently dissolved in the magnetoplumbite ferrite crystal grains, though the concentration of the M element tends to be higher in the crystal grain boundaries than in the crystal grains.

[2] Production Method

In the standard process for producing ferrite magnets essentially comprising the steps of mixing of starting material powders→calcination→fine pulverization of calcined powder→molding→sintering→machining, the basic composition of the ferrite magnet is substantially achieved at the fine pulverization step and thereafter.

Preferable as materials for supplying the R elements are oxides or hydroxides of R elements, particularly hydroxides. Specifically, one or more of oxides such as $La_2O_3$, hydroxides such as $La(OH)_3$, carbonate hydrates such as $La_2(CO_3)_3 \cdot 8H_2O$, organic acid salts such as $La(CH_3CO_2)_3 \cdot 1.5H_2O$, $La_2(C_2O_4)_3 \cdot 10H_2O$, etc. may be used. Oxides, hydroxides, carbonates and organic acid salts of R elements (Nd, Pr, Ce) other than La may also be used. Further, one or more of oxides, hydroxides, carbonates and organic acid salts of mixtures of rare earth elements (La, Nd, Pr and Ce) may also be used. The addition of hydroxides of R elements tends to improve Br, iHc and a squareness ratio Hk/iHc than the addition of oxides thereof. In addition, inexpensive Misch metals (mixed rare earth elements) containing 50 atomic % or more of one or more of La, Nd, Pr and Ce may also be used.

Compounds of M elements are preferably added in the form of oxides or hydroxides, particularly hydroxides. Specifically, one or more of oxides such as $Co_3O_4$; hydroxides such as $Co(OH)_2$, $Co_3O_4 \cdot m_1H_2O$, wherein $m_1$ is a positive number; carbonates such as $CoCO_3$; basic carbonates such as $m_2CoCO_3 \cdot m_3Co(OH)_2 \cdot m_4H_2O$, wherein $m_2$, $m_3$ and $m_4$ are positive numbers, may be used. Oxides, hydroxides or carbonates of Mn, Ni or Zn may also be used. The addition of hydroxides of M elements tends to improve Br, iHc and a squareness ratio Hk/iHc than the addition of oxides thereof.

In both of the post-addition method and the prior/post-addition method, it is preferable to add iron compounds at the time of pulverization (particularly fine pulverization)

after calcination to adjust the molar ratio n. The addition of iron compounds at the time of pulverization serves to arbitrarily adjust the values of y and n at the time of fine pulverization.

The iron compounds post-added may be one or more oxides selected from $Fe_3O_4$, $Fe_2O_3$ ($\alpha$-$Fe_2O_3$, $\gamma$-$Fe_2O_3$) and FeO. Also, hydroxides of iron may be one or more of $Fe(OH)_2$, $Fe(OH)_3$ and FeO(OH).

The amount of the iron compound post-added is preferably 0.1–11 weight % on an iron element basis, per the total amount of Fe added. When the amount of the iron compound post-added is less than 0.1 weight %, sufficient effects of addition cannot be obtained. On the other hand, when the amount of the iron compound post-added exceeds 11 weight %, orientation of ferrite particles at the time of molding in a magnetic field is reduced, resulting in drastic decrease in Br.

The post-addition of the iron compound serves to increase the molar ratio n, resulting in drastic improvement in a squareness ratio. For instance, when the R element is La and the M element is Co, the ferrite magnet has a squareness ratio Hk/iHc of 92.3% or more at 20° C. Also, when the R element is La and the M element is Co plus Mn and/or Zn, the ferrite magnet has a squareness ratio Hk/iHc of 93.5% or more at 20° C. In both cases, the resultant ferrite magnets have a stable shrinkage ratio.

Also at the pulverization step after calcination, spinel-type ferrite compounds such as $CoO.Fe_2O_3$ instead of the Co compound, $MnO.Fe_2O_3$ instead of the Mn compound, $ZnO.Fe_2O_3$ instead of the Zn compound, $(Co, Mn)O.Fe_2O_3$ instead of the Co compound and the Mn compound, $(Mn, Zn)O.Fe_2O_3$ instead of the Mn compound and the Zn compound, $(Co, Zn)O.Fe_2O_3$ instead of the Co compound and the Zn compound, and $(Co, Mn, Zn)O.Fe_2O_3$ instead of the Co compound, the Mn compound and the Zn compound may be added to suppress decrease in the molar ratio n by the post-addition method.

At the wet-fine pulverization step after calcination, powder of compounds of the R elements and/or the M elements, and if necessary, powder of the iron compounds are added in such amounts as to obtain the formulation equal to the final composition of the ferrite sintered body. Wet fine pulverization is carried out until the average diameter of the powder mixture becomes 0.4–0.9 μm. A slurry of finely pulverized powder is concentrated or dried, crumbled, milled, wet-molded and then sintered.

When pulverization is carried out to an average diameter of less than 0.4 μm, undesirable crystal grain growth takes place at the sintering step, resulting in decrease in coercivity and the deterioration of water removal characteristics at the wet-molding step. Also, when the average diameter of the powder exceeds 0.9 μm, there are a lot of coarse crystal grains in the structure of the ferrite sintered body.

It is preferable to add $SiO_2$, CaO, $CaCO_3$, etc. as elements for controlling a sintering phenomenon at the pulverization step after calcination. $SiO_2$ is an additive for suppressing crystal grain growth at the sintering step, and the amount of $SiO_2$ added is preferably 0.05–0.5 weight %, assuming that the basic composition of the ferrite magnet is 100 weight %. When the amount of $SiO_2$ added is less than 0.05 weight %, excessive crystal grain growth takes place at the sintering step, resulting in decrease in coercivity. On the other hand, when the amount of $SiO_2$ added exceeds 0.5 weight %, crystal grain growth is excessively suppressed, resulting in insufficient improvement in orientation that occurs simultaneously with the crystal grain growth, which leads to decrease in Br.

CaO is an element for accelerating the crystal grain growth, and the amount of CaO added is preferably 0.35–0.85 weight %, assuming that the basic composition of the ferrite magnet is 100 weight %. When the amount of CaO added exceeds 0.85 weight %, excessive crystal grain growth takes place at the sintering step, resulting in decrease in coercivity. On the other hand, when the amount of CaO added is less than 0.35 weight %, crystal grain growth is excessively suppressed, resulting in insufficient improvement in orientation that occurs simultaneously with the crystal grain growth, which leads to decrease in Br.

The ferrite magnet produced by the prior/post-addition method is likely to have substantially an intermediate microstructure between the microstructure of the prior-addition method and that of the post-addition method. In the prior/post-addition method, when the R element added at the pulverization step, particularly fine pulverization step, after calcination is 20 atomic % or more, particularly 40 atomic % or more, and less than 100 atomic %, for instance, 50–80 atomic %, per the total amount of the R element added, good improvement in a squareness ratio Hk/iHc can be achieved. Also, in the prior/post-addition method, when the M element added at the pulverization step, particularly fine pulverization step, after calcination is 20 atomic % or more, particularly 40 atomic % or more, and less than 100 atomic % per the total amount of the M element added, remarkable improvement in a squareness ratio Hk/iHc can be achieved.

The important requirements for obtaining the high-performance ferrite magnet are that the composition of the ferrite powder used should be properly controlled, and that the ferrite powder should not be agglomerated in a slurry. As a result of investigation to achieve a state in which each particle of the ferrite powder exists independently in the slurry, it has been found that the agglomeration of ferrite powder is destroyed by drying or concentrating a ferrite powder slurry obtained by the wet-fine pulverization of ferrite powder, adding a dispersant to the resultant high-concentration slurry and milling the slurry, resulting in improvement in orientation of ferrite magnet powder, which leads to improvement in magnetic properties. It has also been found that by adding a dispersant to the slurry at a mixing step, good dispersion can be achieved due to surface modification of ferrite magnet powder by the adsorption of the dispersant, resulting in further improvement in a magnetic force of the ferrite magnet.

Known as dispersants are surfactants, higher aliphatic acids, higher aliphatic acid soap, aliphatic acid esters, etc. It has been found that the dispersion of ferrite particles can be improved by using a polycarboxylic acid dispersant, one of anionic surfactants, effectively preventing the agglomeration of ferrite particles; There are many types of polycarboxylic acid dispersants, and particularly effective for improvement in the dispersion of ferrite particles among them is an ammonium salt of polycarboxylic acid.

The amount of the dispersant added is preferably 0.2–2 weight %, per a solid component in the fine powder slurry. When the amount of the dispersant added is less than 0.2 weight %, effects of adding the dispersant cannot be obtained. On the other hand, when it exceeds 2 weight %, the residual magnetic flux density of the ferrite magnet rather decreases.

The present invention will be described in detail below referring to EXAMPLES, without intention of restricting the scope of the present invention thereto.

REFERENCE EXAMPLES 1–9, COMPARATIVE EXAMPLES 1–3

$SrCO_3$, $Fe_2O_3$, oxides of R elements and oxides of M elements were formulated to provide the following basic composition:

$(Sr_{1-x}R_x)O \cdot n[(Fe_{1-y}M_y)_2O_3]$ by atomic ratio, wherein n=6.0, x=0.15, and y=x/2n=0.0125, wet-mixed, and then calcined at 1200° C. for 2 hours in the air. La was selected as the R element under the criterion that La has an ion radius close to a radius of an Sr ion. Also, Ti, V, Mn, Co, Ni, Cu and Zn were selected as the M elements under the criterion that they had ion radii close to a radius of an Fe ion.

As COMPARATIVE EXAMPLE 1, a ferrite composition in which n=6.0 and x=y=0 in the above basic composition, namely $SrO \cdot 6.0Fe_2O_3$, was calcined in the same manner. Also, as COMPARATIVE EXAMPLES 2 and 3, calcined powder having the same composition as in REFERENCE EXAMPLES except that the R element was La and that the M element was Cu or Co+Cu was produced.

Each calcined powder was coarsely pulverized in a dry state by a roller mill, and each of the resultant coarse powder was measured with respect to magnetic properties by a vibration-type magnetometer. The highest intensity of a magnetic field in which measurement was carried out was 12 kOe, and a saturation magnetization σs and Hc were determined by $\sigma$-$1/H^2$ plot. The resultant phases of the coarse powder were identified by X-ray diffraction, with the results summarized in Table 1. It is appreciated from Table 1 that when Cu was not contained as the M element, only X-ray diffraction peaks for a magnetoplumbite phase (M phase) were observed in any powder. It is also appreciated from Table 1 that when La was selected as the R element, and Mn, Mn+Co, Ni or Ni+Co was selected as the M element, the resultant calcined powder had higher σs (or higher σs and Hc) than that in COMPARATIVE EXAMPLE 1, suggesting that such calcined powder had a potential that a high-performance, bulk ferrite magnet could be formed therefrom by sintering.

In the present invention, combinations of La and Mn+Ni, La and Mn+Co+Ni, La and Mn+Co+Zn, La and Co+Ni+Zn, La and Mn+Ni+Zn, and La and Mn+Co+Ni+Zn may further by used. Among them, when Co is contained, the percentage of Co in the M elements is preferably 10 atomic % or more to have higher Br and iHc than those of conventional ferrite magnets.

TABLE 1

| No. | Composition (atomic %) R Element | Composition (atomic %) M Element | Magnetic Properties σs (emu/g) | Magnetic Properties Hc (kOe) | Phase Produced |
|---|---|---|---|---|---|
| Ref. Ex. 1 | La | 100 Ti | 64.6 | 3.1 | M Phase |
| Ref. Ex. 2 | La | 50 Ti + 50 Co | 62.1 | 0.8 | M Phase |
| Ref. Ex. 3 | La | 100 V | 59.0 | 6.4 | M Phase |
| Ref. Ex. 4 | La | 50 V + 50Co | 59.1 | 6.4 | M Phase |
| Ref. Ex. 5 | La | 100 Mn | 67.1 | 3.7 | M Phase |
| Ref. Ex. 6 | La | 50 Mn + 50 Co | 66.8 | 3.9 | M Phase |
| Ref. Ex. 7 | La | 100 Co | 66.0 | 4.5 | M Phase |
| Ref. Ex. 8 | La | 100 Ni | 66.1 | 2.9 | M Phase |
| Ref. Ex. 9 | La | 50 Ni + 50 Co | 65.9 | 3.5 | M Phase |
| Ref. Ex. 10 | La | 100 Zn | 68.9 | 3.1 | M Phase |
| Ref. Ex. 11 | La | 50 Zn + 50 Co | 67.8 | 3.6 | M Phase |
| Com. Ex. 1 | — | — | 65.4 | 3.1 | M Phase |
| Com. Ex. 2 | La | 100 Cu | 65.8 | 0.3 | M Phase + Undesirable Phase |
| Com. Ex. 3 | La | 50 Cu + 50 Co | 65.1 | 1.2 | M Phase + Undesirable Phase |

EXAMPLE 1

$SrCO_3$ and $Fe_2O_3$ were formulated to provide a basic composition of $SrO \cdot nFe_2O_3$, wherein n=5.95, wet-mixed, and then calcined at 1200° C. for 2 hours in the air. The calcined powder was coarsely pulverized in a dry state by a roller mill, and then finely pulverized in a wet state by an attritor to produce a slurry containing fine powder of 0.80 μm in average diameter. At an early stage of the fine pulverization of each coarse powder, 0–2.5 weight % of $La_2O_3$ and 0–2.3 weight % of CoO, based on the weight of the coarse powder, were added. Also, 1.3 weight % of $Cr_2O_3$ was added at an early stage of the fine pulverization of coarse powder to produce a slurry as a comparative material. In any cases, 0.50 weight % of $SrCO_3$, 0.30 weight % of $SiO_2$ and 0.80 weight % of $CaCO_3$ (0.45 weight % as CaO), based on the weight of the coarse powder, were added as sintering aids. For instance, the final basic composition obtained when 2.50 weight % of $La_2O_3$ and 1.15 weight % of CoO were added approximately corresponds to the following formula:

$(Sr_{1-x}La_x)O \cdot n[(Fe_{1-y}Co_y)_2O_3]$ by atomic ratio, wherein x=0.15, y=x/2n, and n=5.25.

A slurry containing each fine powder of 0.8 μm was wet-molded in a magnetic field of 10 kOe, and each of the resultant green bodies was sintered at 1210–1230° C. for 2 hours. Each of the resultant sintered bodies was machined to a shape of about 10 mm×10 mm×20 mm to measure magnetic properties at 20° C. by a B-H tracer. The results are shown in FIG. 1.

It is clear from FIG. 1 that the addition of 2.50 weight % of $La_2O_3$ and 1.15 weight % of CoO (indicated by "∇") greatly improves iHc as compared with no addition (indicated by "○"), with extremely smaller decrease in Br in a high iHc region than in the case of the addition of $Cr_2O_3$ that is usually added to increase iHc (indicated by "×"). Further, iHc was low when only CoO was added (indicated by "△, □"), or when the balance of charge compensation was destroyed (indicated by "◇").

This EXAMPLE has proved that by utilizing the post-addition method in which the La compound and the Co compound are added to provide the Sr ferrite magnet with the desired basic composition, at the time of fine pulverization after the preparation of coarse calcined powder, the Sr ferrite magnet has higher Br and iHc than the original Sr ferrite magnet.

Next, observation by a scanning-type electron microscope (SEM) was carried out on samples cut away in an appropriate size from sintered bodies prepared by adding $La_2O_3$ and CoO at a fine pulverization step. Table 2 shows the results of SEM analysis of magnetoplumbite ferrite crystal grains and crystal grain boundaries in these samples. It is clear from Table 2 that La (R element) and Co (M element) are fully dissolved in the magnetoplumbite ferrite crystal grains, though they also exist in crystal grain boundaries in large amounts. Further, analysis by SEM, etc. at 20 sites in each of the crystal grain boundaries and the crystal grains of this sample have revealed that La (R element) and/or Co (M element) tend to be higher in concentration in the crystal grain boundaries than in the magnetoplumbite ferrite crystal grains. This clearly has a close relation to the fact that the ferrite magnet was prepared by the post-addition method in which $La_2O_3$ and CoO were added for adjustment to the basic composition of the sintered body at the fine pulverization step after calcination.

TABLE 2

| Position | Si | Ca | Fe | Sr | La | (weight %) Co |
|---|---|---|---|---|---|---|
| Position (1) in Crystal Grain | 1.9 | — | 85.9 | 8.3 | 2.8 | 1.1 |
| Position (2) in Crystal Grain | 2.2 | — | 85.5 | 8.3 | 2.7 | 1.3 |
| Position (1) in Crystal Grain Boundary | 15.7 | 12.5 | 25.9 | 29.9 | 15.8 | 0.2 |
| Position (2) in Crystal Grain Boundary | 16.6 | 13.3 | 27.4 | 31.5 | 0.4 | 10.8 |

Though this EXAMPLE indicates a case where R=La and M=Co, it should be noted that ferrite magnets formed from combinations of other R elements and other M elements would also have high coercivity iHc (or high coercivity iHc and residual magnetic flux density Br), as long as they have the same microstructures as in this EXAMPLE.

EXAMPLE 2

This EXAMPLE shows that variation of magnetic properties and shrinkage ratio decreases by the addition of an iron compound at a fine pulverization step after calcination, in the production of ferrite magnets by a post-addition method.

$SrCO_3$ and $Fe_2O_3$ were formulated to provide a basic composition of $SrO.nFe_2O_3$, wherein n=5.9, wet-mixed, and then calcined at 1250° C. for 2 hours in the air. The calcined powder was coarsely pulverized in a dry state by a roller mill, and then finely pulverized in a wet state by an attritor to produce a slurry containing fine powder of 0.8 μm in average diameter. Added at an early stage of the fine pulverization of the coarse powder were 2.5 weight % of $La_2O_3$, 1.2 weight % of $Co_3O_4$ and 2–8 weight % of $Fe_3O_4$ (magnetite), based on the weight of the coarse powder. Further, 0.1 weight % of $SrCO_3$, 1.0 weight % of $CaCO_3$ and 0.3 weight % of $SiO_2$, based on the weight of the coarse powder, were added as sintering aids. Each of the resultant fine powder slurries were wet-molded in a magnetic field of 10 kOe, and each of the resultant green bodies was sintered at 1210–1230° C. for 2 hours. The resultant sintered body had a basic composition approximately corresponding to the following formula:

$(Sr_{1-x}La_x)O.n[(Fe_{1-y}Co_y)_2O_3]$ by atomic ratio, wherein x=0.15, y=x/2n, and n=5.32–5.67.

Figure 2:
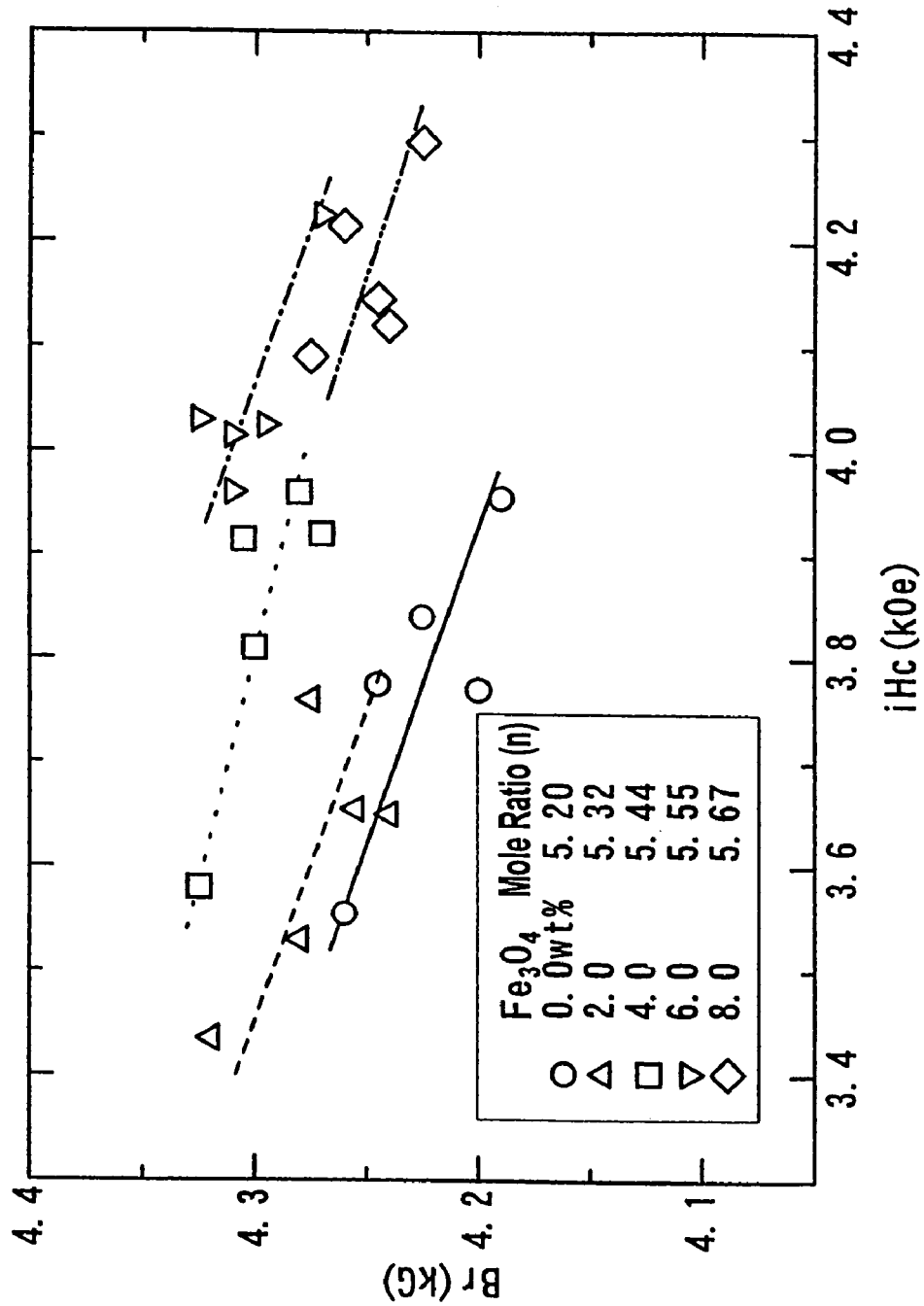
FIG. 2 is a graph showing the correlation between the amount of $Fe_3O_4$ added and magnetic properties in the ferrite magnets in EXAMPLES 2 and 3.

The resultant sintered body was machined to a shape of about 10 mm×10 mm×20 mm to measure magnetic properties at 20° C. by a B-H tracer. The results are shown in FIG. 2, in which the axis of ordinates represents Br (kG), and the axis of abscissas represents iHc (kOe).

EXAMPLE 3

Ferrite magnets having the following basic composition:

$(Sr_{1-x}La_x)O.5.20[(Fe_{1-y}Co_y)_2O_3]$ by atomic ratio, wherein x=0.15, and y=x/2n, were prepared in the same manner as in EXAMPLE 2 except for adding no $Fe_3O_4$. The resultant ferrite magnets had a molar ratio n decreased to 5.20. the magnetic properties measured in the same manner as in EXAMPLE 2 are shown in FIG. 2.

It is clear from FIG. 2 that magnetic properties are improved when 2–8 weight % of $Fe_3O_4$ was added than when the amount of $Fe_3O_4$ added was 0 weight %. For instance, the addition of 6 weight % of $Fe_3O_4$ contributed to increase in Br by about 100 G in a case where there was no change in iHc, and increase in iHc by about 600 Oe in a case where there was no change in Br, as compared to no addition of $Fe_3O_4$ (EXAMPLE 3).

It has further been found by investigation in connection with FIG. 2 that not only improvement in Br, iHc and a squareness ratio Hk/iHc but also stabilization of shrinkage ratio can be achieved by the addition of 0.1–11 weight % (on an Fe element basis) of $Fe_3O_4$ as compared to no addition of $Fe_3O_4$ (EXAMPLE 3). Also, when the amount of $Fe_3O_4$ added was 0.1–11 weight % (on an Fe element basis), high-coercivity, high-performance ferrite magnets having Br of 4,150–4,400 G, iHc of 4,050–4,500 Oe, and a squareness ratio Hk/iHc of 94.5–96% were obtained.

Figure 3:
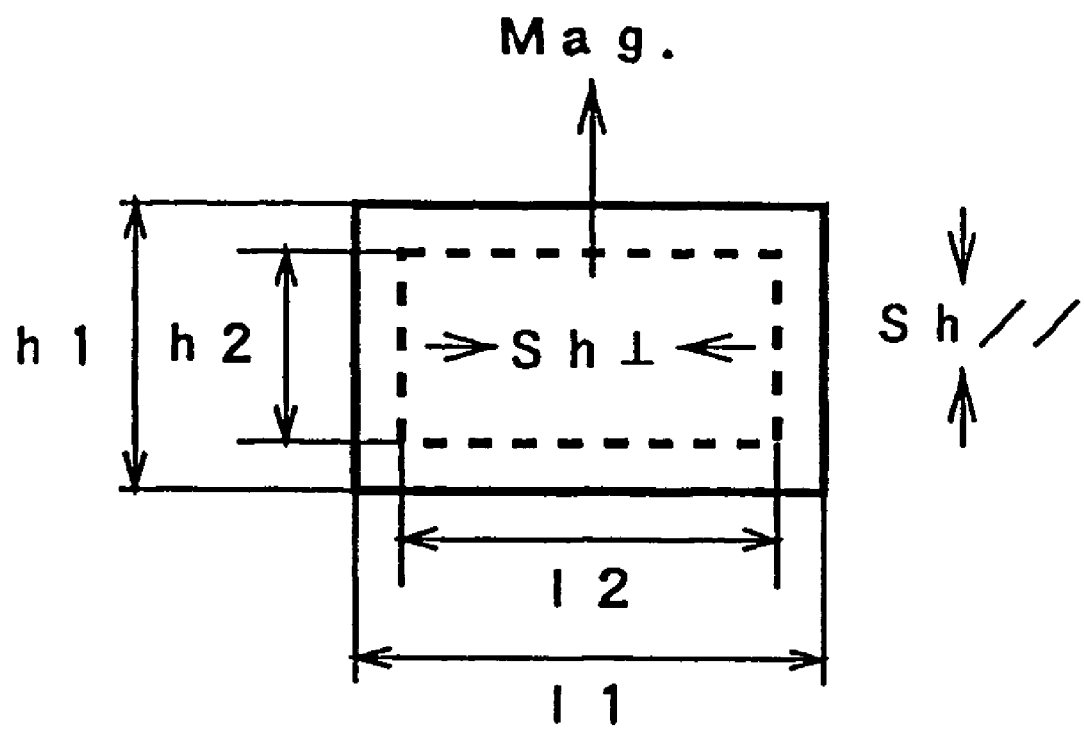
FIG. 3 is a schematic view explaining the sintering shrinkage ratio.

Next, correlation between the amount of $Fe_3O_4$ added and a shrinkage ratio will be investigated. As shown in FIG. 3, the shrinkage ratio includes a shrinkage ratio (Sh//) along the direction of magnetic anisotropy (Mag.) substantially identical to the direction of a magnetic field applied in a wet-molding process, and a shrinkage ratio (Sh⊥) along the direction vertical thereto, each being defined as follows:

$(Sh//)=(h_1-h_2)/h_1 \times 100(\%)$, $(Sh\perp)=(l_1-l_2)/l_1 \times 100(\%)$, $l_1$: Length of green body,
$l_2$: Length of sintered body,
$h_1$: thickness of green body, and
$h_2$: thickness of sintered body.

Figure 4:
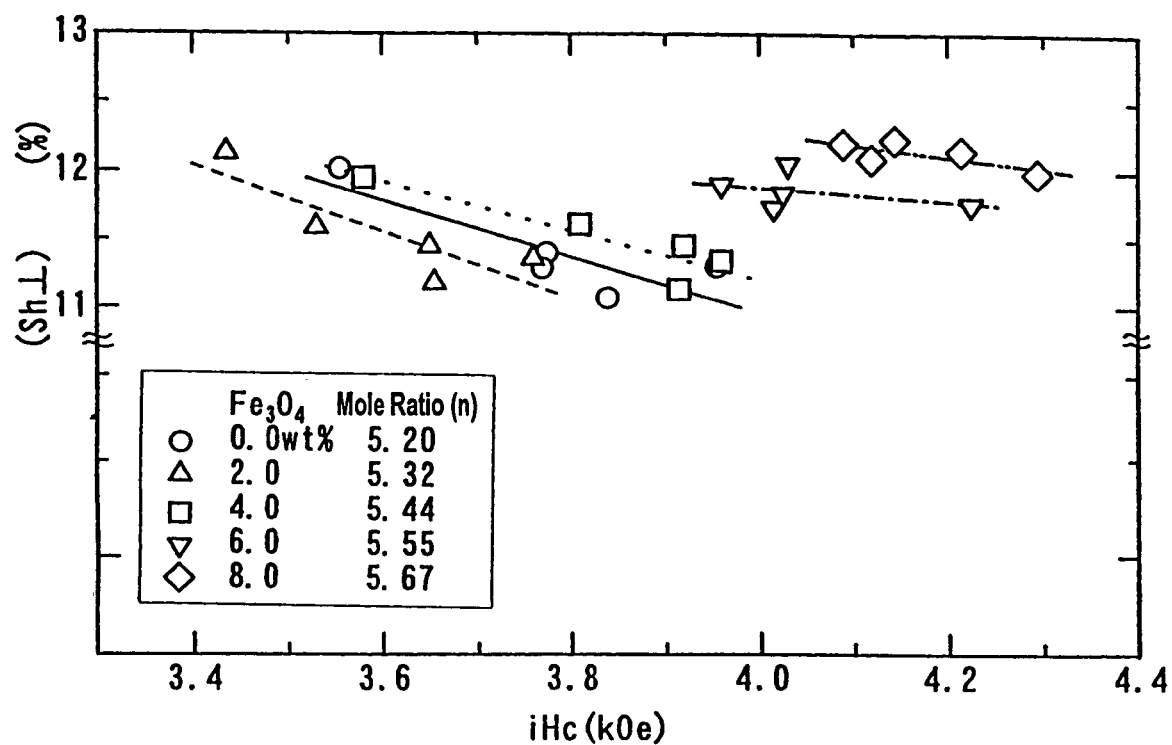
FIG. 4 is a graph showing the correlation between the amount of $Fe_3O_4$ added and a sintering shrinkage ratio in the ferrite magnets in EXAMPLES 2 and 3.

With respect to ferrite magnets obtained in EXAMPLES 2 and 3, the dependency of the correlation of iHc and (Sh⊥) on the amount of $Fe_3O_4$ added (molar ratio n) is shown in FIG. 4. In FIG. 4, five plots (◇) in a case where 8.0 weight % of $Fe_3O_4$ was added indicate a range of the variation of (Sh⊥) at a sintering temperature of 1210–1230° C. Δ(Sh⊥), a range of variation of (Sh⊥) at each amount of $Fe_3O_4$ added, is defined by the formula: Δ(Sh⊥)=(maximum of Sh⊥)– (minimum of Sh⊥). FIG. 4 verifies that as the amount of $Fe_3O_4$ added (molar ratio n) increases, the range of variation of shrinkage ratio Δ(Sh⊥) decreases. Further, when the amount of $Fe_3O_4$ added increases to 15 weight %, the molar ratio n can be increased to about 6, and Δ(Sh⊥) can be made extremely small. Thus, in the ferrite magnets formed by the post-addition method, (Sh⊥) and Δ(Sh⊥) can freely be controlled within the ranges of (Sh⊥)=11–13.5% and Δ(Sh⊥)=0.05–0.9%. To suppress dimensional variations of ferrite magnet products, Δ(Sh⊥) is preferably 0.05–0.8%, more preferably 0.05–0.5%, particularly preferably 0.05–0.3%.

Further, Δ(Sh⊥/Sh//), a range of variation of (Sh⊥/Sh//) at each amount of $Fe_3O_4$ added, is defined by the formula: Δ(Sh⊥/Sh//)=(maximum of Sh⊥/Sh//)–(minimum of Sh⊥/ Sh//). It has been verified from measurement results related to FIG. 4 that as the amount of $Fe_3O_4$ added (molar ratio n) increases, the range of variation of shrinkage ratio Δ(Sh⊥/Sh//) decreases. Further, when the amount of $Fe_3O_4$ added increases to 15 weight %, the molar ratio n can be increased to about 6, and Δ(Sh⊥/Sh//) can be made extremely small. Thus, in the ferrite magnets formed by the post-addition method, (Sh⊥/Sh//) and Δ(Sh⊥/Sh//) can freely be controlled within the ranges of (Sh⊥/Sh//)=1.6–2.4 and Δ(Sh⊥/Sh//)= 0.05–0.30. To suppress dimensional variations of ferrite magnet products, as the molar ratio n nears about 6, Δ(Sh⊥/Sh//) can be made small, with (Sh⊥/Sh//) controlled to 1.9–2.2. Δ(Sh⊥/Sh//) is controlled to more preferably 0.05–0.20, further preferably 0.05–0.15, particularly preferably 0.05–0.10.

COMPARATIVE EXAMPLE 4

La and Co were selected as the R element and the M element, respectively, and $SrCO_3$, $Fe_2O_3$, $La_2O_3$ and $Co_3O_4$ were formulated to provide the following basic composition:

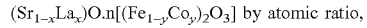

wherein x=0–0.5, y=x/2n, and n=5.85, wet-mixed, and then calcined at 1200° C. for 2 hours in the air. The calcined powder was coarsely pulverized in a dry state by a roller mill, and then finely pulverized in a wet state by an attritor to produce a slurry containing fine powder of 0.8 μm in average diameter. Added as sintering aids at an early stage of the fine pulverization of the coarse powder were 0.40 weight % of $SiO_2$ and 0.80 weight % of $CaCO_3$ (0.45 weight % as CaO), based on the weight of the coarse powder. Each of the resultant fine powder slurries was wet-molded in a magnetic field of 10 kOe, and each of the resultant green bodies was sintered at 1210–1230° C. for 2 hours. Each of the resultant sintered bodies was machined to a shape of about 10 mm×10 mm×20 mm.

EXAMPLE 4

$SrCO_3$ and $Fe_2O_3$ were formulated to provide a basic composition of $SrO.nFe_2O_3$, wherein n=5.6, wet-mixed, and then calcined at 1250° C. for 2 hours in the air. Thereafter, 2–8 weight % of $Fe_3O_4$ (magnetite) was added at an early stage of the fine pulverization step of coarse powder by a post-addition method in the same manner as in EXAMPLE 2, to produce sintered ferrite magnets. Each of the resultant sintered bodies substantially had the following composition:

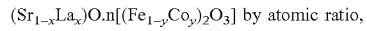

wherein x=0.15, y=x/2n, and n=5.01–5.35.

Among them, ferrite magnets having n of 5.01–5.20 had substantially as high magnetic properties as those of EXAMPLE 3, fully satisfactory for practical applications. Also, the ferrite magnets having n exceeding 5.20 had substantially as high magnetic properties as those of the equimolar-ratio ferrite magnets obtained in EXAMPLE 2.

COMPARATIVE EXAMPLE 5

Ferrite magnets were produced in the same manner as in EXAMPLE 2 except that a molar ratio n in the basic composition of $SrO.nFe_2O_3$ was controlled to 6.3 at the time of mixing before calcination, and that 6 weight % of $Fe_3O_4$ (magnetite) was added at an early stage of the fine pulverization step of coarse powder by a post-addition method, and their magnetic properties were measured at 20° C. by a B-H tracer. The resultant ferrite magnet substantially had the following composition:

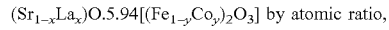

wherein x=0.15, and y=x/2n.

The magnetic properties of these ferrite magnets were so low that they could not be plotted in FIG. 2. Considerable precipitation of α-$Fe_2O_3$, which may be considered due to insufficient ferritization reaction, was observed in the calcined powder of this COMPARATIVE EXAMPLE. It was confirmed that the precipitation of α-$Fe_2O_3$ deteriorated the magnetic properties of the final ferrite magnets.

EXAMPLE 5

$SrCO_3$ and $Fe_2O_3$ were formulated to provide a basic composition of $SrO.nFe_2O_3$, wherein n=5.9, wet-mixed, and then calcined at 1250° C. for 2 hours in the air. The calcined powder was coarsely pulverized in a dry state by a roller mill, and then finely pulverized in a wet state by an attritor to produce a slurry containing fine powder of 0.8 μm in average diameter. Added at an early stage of the fine pulverization of each coarse powder were 2.5 weight % of $La_2O_3$ and 1.2 weight % of $Co_3O_4$, together with 6 weight % of $Fe_3O_4$ (magnetite) or 6.2 weight % of $Fe_2O_3$ (hematite), based on the weight of the coarse powder. Further, 0.3 weight % of $SrCO_3$, 1.0 weight % of $CaCO_3$ and 0.3 weight % of $SiO_2$, based on the weight of the coarse powder, were added as sintering aids at an early stage of the fine pulverization of each coarse powder. Each of the resultant two fine powder slurries was wet-molded in a magnetic field of 10 kOe, and each of the resultant green bodies was sintered at 1210–1230° C. for 2 hours. Each of the resultant two sintered bodies substantially had the following formula:

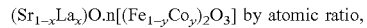

wherein x=0.15, y=x/2n, and n=5.55 (when 6 weight % of $Fe_3O_4$ was added) or n=5.50 (when 6.2 weight % of $Fe_2O_3$ was added).

Each of the resultant sintered bodies was machined to a shape of about 10 mm×10 mm×20 mm to measure magnetic properties at 20° C. by a B-H tracer. The results are shown in FIG. 5, in which the axis of ordinates represents Br (kG), and the axis of abscissas represents iHc (kOe).

Figure 5:
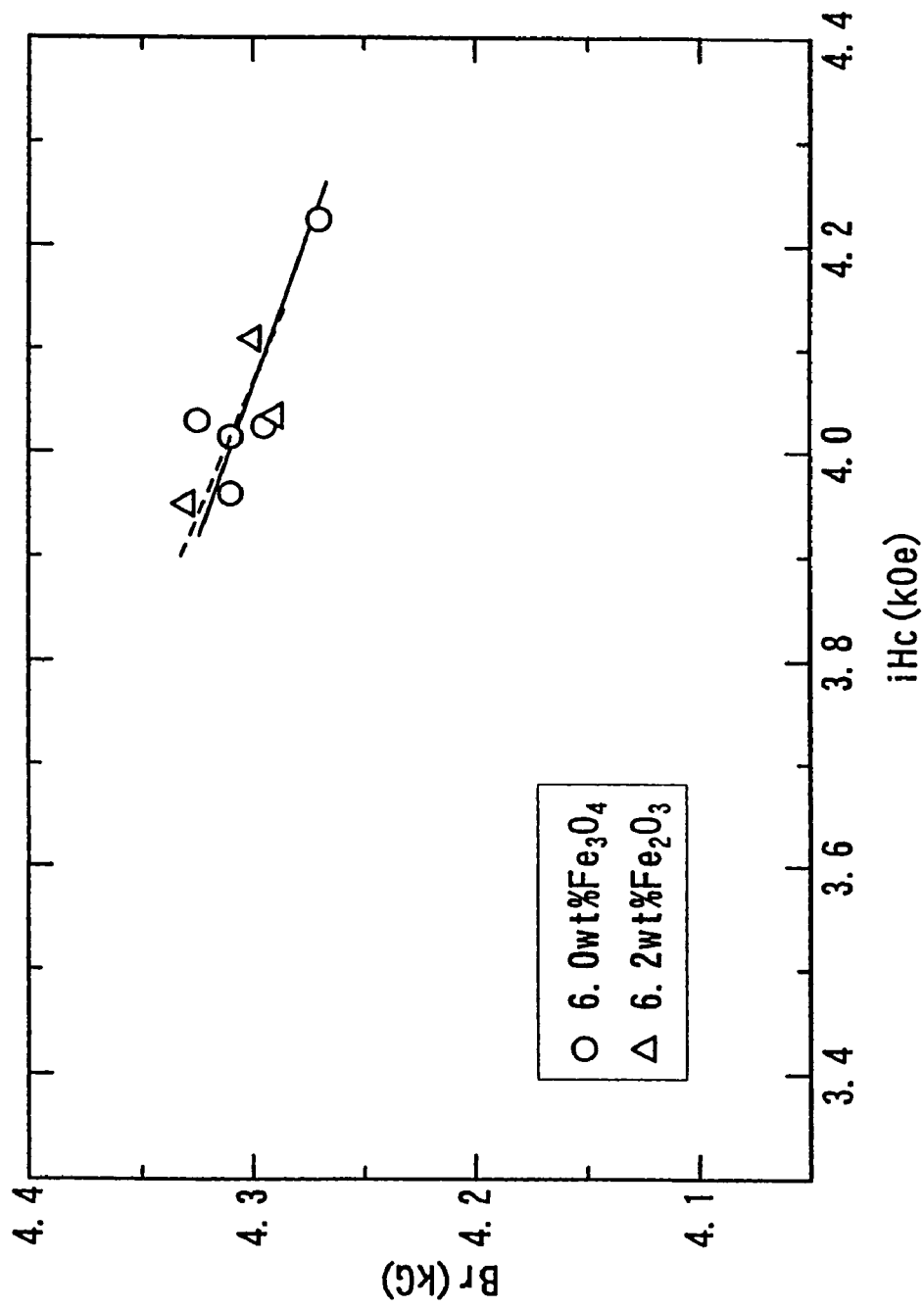
FIG. 5 is a graph showing the effectiveness of $Fe_2O_3$ in the ferrite magnet in EXAMPLE 5.

It has been found from FIG. 5 and its related investigation that the addition of 6 weight % of $Fe_3O_4$ (magnetite) or 6.2 weight % of $Fe_2O_3$ (hematite) contributes to remarkable improvement in magnetic properties, Δ(Sh⊥), and Δ(Sh⊥/Sh//) as compared with EXAMPLE 3. Thus, $Fe_2O_3$ (hematite) is as effective as $Fe_3O_4$ (magnetite) in the post-addition method.

EXAMPLE 6

$SrCO_3$ and $Fe_2O_3$ were formulated to provide a basic composition of $SrO.nFe_2O_3$, wherein n=5.9, wet-mixed, and then calcined at 1250° C. for 2 hours in the air. The calcined powder was coarsely pulverized in a dry state by a roller mill, and then finely pulverized in a wet state by an attritor to produce a slurry containing fine powder of 0.8 μm in average diameter. Added at an early stage of the fine pulverization of each coarse powder were 2.5 weight % of $La_2O_3$, 0.6 weight % of $Co_3O_4$ and 0.6 weight % of ZnO, together with 2–8 weight % of $Fe_3O_4$ (magnetite), based on the weight of the coarse powder. Further, 0.1 weight % of $SrCO_3$, 1.0 weight % of $CaCO_3$ and 0.3 weight % of $SiO_2$, based on the weight of the coarse powder, were added as sintering aids at an early stage of the fine pulverization of each coarse powder. Each of the resultant two fine powder slurries was wet-molded in a magnetic field of 10 kOe, and each of the resultant green bodies was sintered at 1210–1230° C. for 2 hours. Each of the resultant sintered bodies substantially had the following formula:

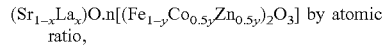
$(Sr_{1-x}La_x)O \cdot n[(Fe_{1-y}Co_{0.5y}Zn_{0.5y})_2O_3]$ by atomic ratio, wherein x=0.15, y=x/2n, and n=5.32–5.67.

Figure 6:
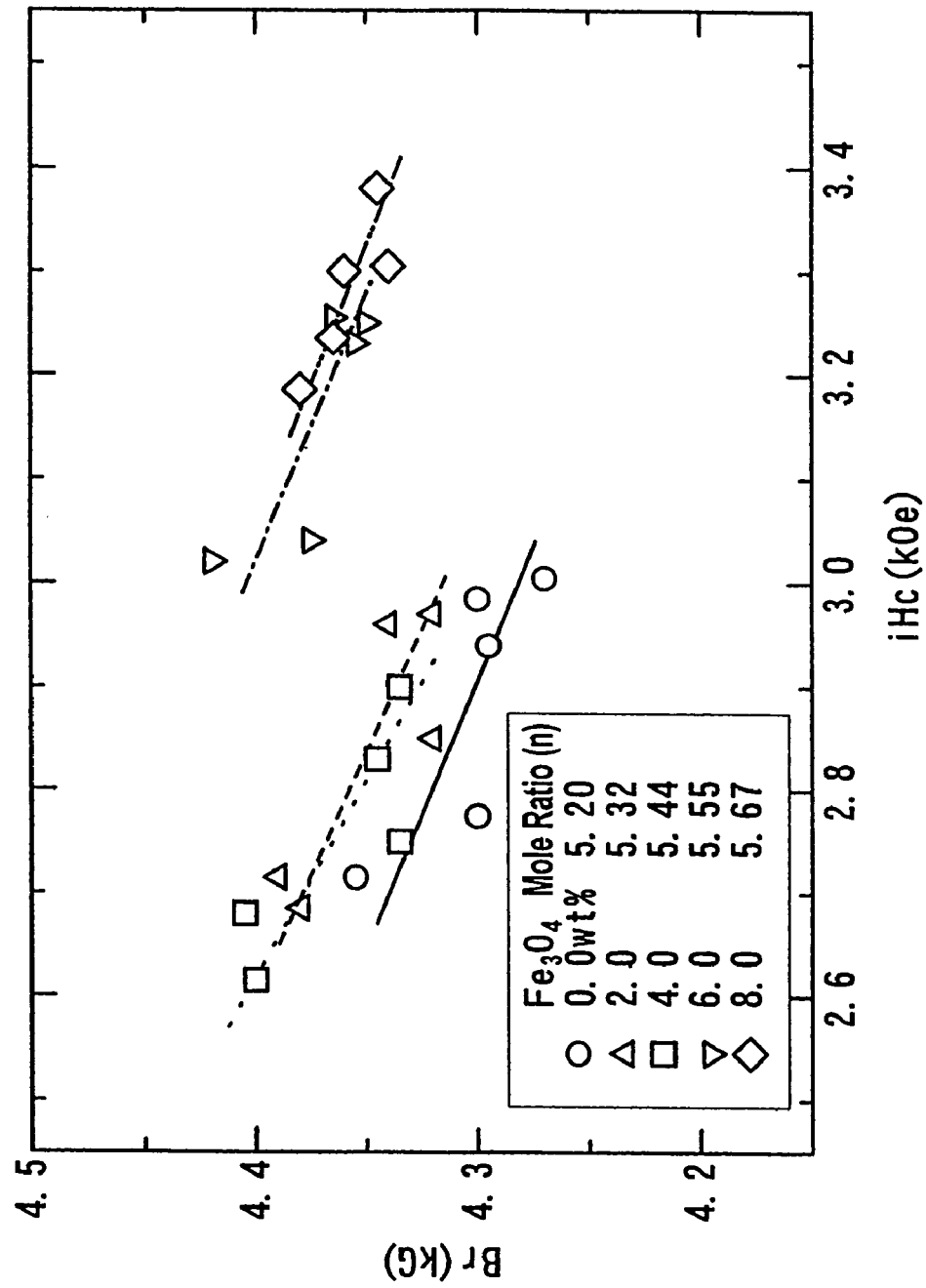
FIG. 6 is a graph showing the correlation between the amount of $Fe_3O_4$ added and magnetic properties in the ferrite magnet in EXAMPLE 6.

Each of the resultant sintered bodies was machined to a shape of about 10 mm×10 mm×20 mm to measure magnetic properties at 20° C. by a B-H tracer. The results are shown in FIG. 6, in which the axis of ordinates represents Br (kG), and the axis of abscissas represents iHc (kOe).

EXAMPLE 7

Ferrite magnets were produced in the same manner as in EXAMPLE 6 except for no post-addition of $Fe_3O_4$ to measure their magnetic properties. The ferrite sintered bodies obtained without post-addition of $Fe_3O_4$ substantially had the following formula:

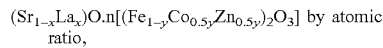
$(Sr_{1-x}La_x)O \cdot n[(Fe_{1-y}Co_{0.5y}Zn_{0.5y})_2O_3]$ by atomic ratio, wherein x=0.15, y=x/2n, and n=5.20.

The magnetic properties of the ferrite sintered bodies are shown in FIG. 6. It is clear from FIG. 6 that magnetic properties are improved when 2–8 weight % of $Fe_3O_4$ was post-added (EXAMPLE 6) than when no $Fe_3O_4$ was added (EXAMPLE 7). For instance, the addition of 6–8 weight % of $Fe_3O_4$ contributed to increase in Br by about 100 G in a case where there was no change in iHc, and increase in iHc by about 600 Oe in a case where there was no change in Br, as compared to no addition of $Fe_3O_4$.

It has further been found from related investigation that not only improvement in magnetic properties but also stabilization of shrinkage ratio can be achieved by the addition of 0.1–11 weight % (on an Fe element basis) of $Fe_3O_4$ as compared to no addition of $Fe_3O_4$ (EXAMPLE 7). Specifically, the post-addition of $Fe_3O_4$ could provide high-Br, high-performance ferrite magnets with Br of 4,250–4,450 G, iHc of 3,000–3,800 Oe, and a squareness ratio Hk/iHc of 94.5–97%.

(Sh⊥) and Δ(Sh⊥) of the ferrite magnets can freely be controlled within the ranges of (Sh⊥)=11–13.5% and Δ(Sh⊥)=0.05–0.9%. To suppress dimensional variations of ferrite magnet products, Δ(Sh⊥) can be made preferably 0.05–0.8%, more preferably 0.05–0.5%, particularly preferably 0.05–0.3%. In addition, (Sh⊥/Sh//) and Δ(Sh⊥/Sh//) can freely be controlled within the ranges of (Sh⊥/Sh//)= 1.6–2.4 and Δ(Sh⊥/Sh//)=0.05–0.30. To suppress dimensional variations of ferrite magnet products, as the molar ratio n nears about 6, Δ(Sh⊥/Sh//) can be made small, with (Sh⊥/Sh//) controlled to 1.9–2.2. Δ(Sh⊥/Sh//) is controlled to more preferably 0.05–0.20, further preferably 0.05–0.15, particularly preferably 0.05–0.10.

EXAMPLE 8

$SrCO_3$ and $Fe_2O_3$ were formulated to provide a basic composition of $SrO \cdot nFe_2O_3$, wherein n=5.6, wet-mixed, and then calcined at 1250° C. for 2 hours in the air. Thereafter, 2–8 weight % of $Fe_3O_4$ (magnetite) was added at an early stage of the fine pulverization step of coarse powder by a post-addition method in the same manner as in EXAMPLE 6, to produce sintered ferrite magnets. Each of the resultant sintered bodies substantially had the following composition:

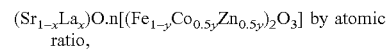
$(Sr_{1-x}La_x)O \cdot n[(Fe_{1-y}Co_{0.5y}Zn_{0.5y})_2O_3]$ by atomic ratio, wherein x=0.15, y=x/2n, and n=5.00–5.34.

Among them, ferrite magnets having n of 5.00–5.20 had substantially as high magnetic properties as those of EXAMPLE 7, fully satisfactory for practical applications. Also, the ferrite magnets having n exceeding 5.20 had substantially the same magnetic properties as those of the equimolar-ratio ferrite magnets obtained in EXAMPLE 6.

EXAMPLE 9

A ferrite magnet was produced in the same manner as in EXAMPLE 8 except for adding no $Fe_3O_4$ (magnetite) at an early stage of the fine pulverization step of coarse powder, to measure magnetic properties thereof. The resultant ferrite magnet had a squareness ratio Hk/iHc of 93.5%.

EXAMPLE 10

$SrCO_3$, $Fe_2O_3$, $La_2O_3$ and $Co_3O_4$ were formulated to provide a basic composition represented by the following formula:

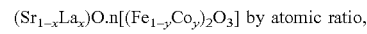
$(Sr_{1-x}La_x)O \cdot n[(Fe_{1-y}Co_y)_2O_3]$ by atomic ratio, wherein x=0.075, y=x/2n, and n=5.9, wet-mixed, and then calcined at 1250° C. for 2 hours in the air. The calcined powder was coarsely pulverized in a dry state by a roller mill, and then finely pulverized in a wet state by an attritor to produce a slurry containing fine powder of 0.8 μm in average diameter. Added at an early stage of the fine pulverization of each coarse powder were 1.25 weight % of $La_2O_3$ and 0.6 weight % of $Co_3O_4$, together with 1–4 weight % of $Fe_3O_4$ (magnetite), based on the weight of the coarse powder. Further, 0.1 weight % of $SrCO_3$, 1.0 weight % of $CaCO_3$ and 0.3 weight % of $SiO_2$, based on the weight of the coarse powder, were added as sintering aids at an early stage of the fine pulverization of coarse powder. The resultant fine powder slurry was wet-molded in a magnetic field of 10 kOe, and each of the resultant green bodies was sintered at 1210–1230° C. for 2 hours. Each of the resultant sintered bodies substantially had a basic composition corresponding to

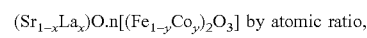
$(Sr_{1-x}La_x)O \cdot n[(Fe_{1-y}Co_y)_2O_3]$ by atomic ratio, wherein y=x/2n, x=0.15, and n=5.61–5.78.

Each of the resultant sintered bodies was machined to a shape of about 10 mm×10 mm×20 mm to measure magnetic properties at 20° C. by a B-H tracer. It has been found that any ferrite magnets had substantially as high magnetic properties as those of the equimolar-ratio ferrite magnets shown in FIG. 2.

EXAMPLE 11

A ferrite magnet was produced in the same manner as in EXAMPLE 10 except for adding no $Fe_3O_4$ (magnetite) at an early stage of the fine pulverization step of coarse powder, to measure magnetic properties thereof.

The comparison of EXAMPLES 10 and 11 indicated the tendency that as the amount of $Fe_3O_4$ added increased, the magnetic properties were gradually improved, and both $\Delta(Sh\perp)$ and $\Delta(Sh\perp/Sh//)$ decreased.

EXAMPLE 12

$SrCO_3$, $Fe_2O_3$, $La_2O_3$, $Co_3O_4$ and ZnO were formulated to provide a basic composition represented by the following formula:

$(Sr_{1-x}La_x)O.n[(Fe_{1-y}Co_{0.5y}Zn_{0.5y})_2O_3]$ by atomic ratio, wherein x=0.075, y=x/2n, and n=5.9, wet-mixed, and then calcined at 1250° C. for 2 hours in the air. The calcined powder was coarsely pulverized in a dry state by a roller mill, and then finely pulverized in a wet state by an attritor to produce a slurry containing fine powder of 0.8 μm in average diameter. Added at an early stage of the fine pulverization of each coarse powder were 1.25 weight % of $La_2O_3$, 0.3 weight % of $Co_3O_4$ and 0.3 weight % of ZnO, together with 1–4 weight % of $Fe_3O_4$ (magnetite), based on the weight of the coarse powder. Further, 0.1 weight % of $SrCO_3$, 1.0 weight % of $CaCO_3$ and 0.3 weight % of $SiO_2$, based on the weight of the coarse powder, were added as sintering aids at an early stage of the fine pulverization of coarse powder. The resultant fine powder slurry was wet-molded in a magnetic field of 10 kOe, and each of the resultant green bodies was sintered at 1210–1230° C. for 2 hours. Each of the resultant sintered bodies substantially had a basic composition corresponding to $(Sr_{1-x}La_x)O.n[(Fe_{1-y}Co_{0.5y}Zn_{0.5y})_2O_3]$ by atomic ratio, wherein x=0.15, y=x/2n, and n=5.60–5.77.

Each of the resultant sintered bodies was machined to a shape of about 10 mm×10 mm×20 mm to measure magnetic properties at 20° C. by a B-H tracer. It has been found that any ferrite magnets had substantially as high magnetic properties as those of the equimolar-ratio ferrite magnets shown in FIG. 6, and that their $\Delta(Sh\perp)$ was stably less than 0.5%.

EXAMPLE 13

A ferrite magnet was produced in the same manner as in EXAMPLE 12 except for adding no $Fe_3O_4$ (magnetite) at an early stage of the fine pulverization step of coarse powder, to measure magnetic properties thereof at 20° C. by a B-H tracer.

The comparison of EXAMPLES 12 and 13 indicated the tendency that as the amount of $Fe_3O_4$ added increased, the magnetic properties were gradually improved, and both $\Delta(Sh\perp)$ and $\Delta(Sh\perp/Sh//)$ decreased.

By adding both La and Co, and by utilizing the post or prior/post-addition method by which the molar ratio n can be freely controlled, it is possible to provide high-coercivity, high-performance ferrite magnets having Br of 4,400–4,500 G, iHc of 4,400–4,500 Oe and Hk/iHc of 95–96% at 20° C., when compositions are selected to meet $0.1 \leq x < 0.2$.

By adding $Cr_2O_3$ and/or $Al_2O_3$ remarkably increasing iHc while decreasing Br in an amount of 0.1–2 weight %, more preferably 0.2–1.5 weight %, particularly preferably 0.3–1.0 weight %, it is possible to provide high-performance ferrite magnets having higher coercivity than that of conventional ferrite magnets while keeping high Br. When the amount of $Cr_2O_3$ and/or $Al_2O_3$ added is less than 0.1 weight %, effects of adding such component are not appreciated. On the other hand, when it exceeds 2 weight %, Br drastically decreases. For instance, when 0.3–1.0 weight % of $Cr_2O_3$ and/or $Al_2O_3$ is added to the ferrite magnets of the present invention, they can be turned to high-performance ferrite magnets having extremely high coercivity, specifically Br of 4,200–4,300 G and iHc of 4,800–5,200 Oe at 20° C.

By adding La, Co and Zn and/or Mn, and by utilizing the post or prior/post-addition method by which the molar ratio n can be freely controlled according to the present invention, it is possible to provide high-Br, high-performance ferrite magnets having Br of 4,400–4,600 G, iHc of 3,300–3,800 Oe and Hk/iHc of 95–97% at 20° C.

In the above EXAMPLES utilizing the post-addition method and/or the prior/post-addition method, the Fe compounds such as magnetite or hematite were post-added at the time of fine pulverization. However, it should be noted that the timing of the post-addition of the Fe compounds is not particularly restricted, as long as it is after calcination. The post-addition of the Fe compounds can be carried out at any time between a state of calcined powder obtained by completion of a ferritization reaction and molding. When the post-addition of the Fe compounds is carried out at a time outside the fine pulverization step, it is preferable to perform uniform mixing such as mixing with agitation. When compounds of the R elements and/or the M elements are post-added, their post-addition can be carried out at any time between a state of calcined powder obtained by completion of a ferritization reaction and molding.

Next, it has been found that if compounds of rare earth elements are added not in the form of oxides but in the form of hydroxides, carbonates or organic acid salts in the production of the ferrite magnets of the present invention, reactivity would be improved, resulting in increase in the magnetic properties of the resultant ferrite magnets. The first factor for achieving improvement in the magnetic properties is that the hydroxides, carbonates or organic acid salts of the R elements such as La, etc. are in the form of finer powder than R element oxides. The second factor is that when the hydroxides, carbonates or organic acid salts of the rare earth elements are decomposed to oxides in a temperature elevation stage at calcination or sintering, primary crystal grains are made finer, resulting in increase in reactivity. The third factor is that the above decomposition reaction per se contributes to increase in reactivity. It appears that these first to third factors similarly exist in the case of hydroxides, etc. of the M elements such as Co, etc.

One example suitable for mass production is that hydroxides, etc. of the R element and the M element are added at the time of pulverization (particularly fine pulverization) after calcination to provide the final composition of the ferrite magnet according to the present invention. Effects of improving magnetic properties by hydroxides, etc. of the R elements and/or the M elements are remarkable particularly in the case of the post-addition method. This is because a ferrite composition undergoes only one high-temperature process, particularly a sintering process, in the post-addition method, whereby high reactivity of hydroxides, carbonates or organic acid salts is much more effective than in the case of a post-addition method using oxides.

As an applied example in which a hydroxide of the M element is post-added, the direct addition of the hydroxide powder may be changed to the addition of a hydroxide of the M element formed by mixing a dispersion of ferrite material powder in a $CoCl_2$ aqueous solution with an alkaline material such as NaOH, $NH_4OH$, etc. The same is true of La.

EXAMPLE 14

SrCO$_3$ and Fe$_2$O$_3$ were formulated to provide a basic composition of SrO.5.9Fe$_2$O$_3$, wet-mixed, and then calcined at 1200° C. for 2 hours in the air. The calcined powder was coarsely pulverized in a dry state by a roller mill, and then finely pulverized in a wet state by an attritor to produce a slurry containing fine powder of 0.7–0.8 μm in average diameter. La(OH)$_3$ and Co(OH)$_2$ were added at an early stage of the fine pulverization of coarse powder. Further, 0.50 weight % of SrCO$_3$, 0.80 weight % of CaCO$_3$ and 0.45 weight % of SiO$_2$, based on the weight of the coarse powder, were added as sintering aids. The resultant fine powder slurry was wet-molded in a magnetic field of 10 kOe, and each of the resultant green bodies was sintered at 1210–1230° C. for 2 hours. Each of the resultant sintered bodies substantially had the following formula:

$(Sr_{1-x}La_x)O.n[(Fe_{1-y}Co_y)_2O_3]$, wherein x=0.15, y=x/2n, and n=5.20.

Each of the resultant sintered bodies was machined to a shape of about 10 mm×10 mm×20 mm to measure magnetic properties at 20° C. by a B-H tracer. The results are shown in Table 3.

COMPARATIVE EXAMPLE 6

A ferrite magnet was produced in the same manner as in EXAMPLE 14 except for adding La$_2$O$_3$ and Co$_3$O$_4$ in such amounts as to meet x=0.15 at a mixing step before calcination, to measure magnetic properties thereof. The results are shown in Table 3.

EXAMPLE 15

A ferrite magnet was produced in the same manner as in EXAMPLE 14 except for adding La$_2$O$_3$ and Co$_3$O$_4$ in such amounts as to meet x=0.15 and y=x/2n at an early stage of the fine pulverization step of coarse powder, to measure magnetic properties thereof at 20° C. by a B-H tracer. The results are shown in Table 3.

The comparison of EXAMPLES 14 and 15 and COMPARATIVE EXAMPLE 6 in Table 3 indicated that by adding the La compound and the Co compound at the time of fine pulverization, and by using La(OH)$_3$ and Co(OH)$_2$ as the La compound and the Co compound, iHc could be remarkably improved while keeping the squareness ratio Hk/iHc at a good level.

EXAMPLE 16

A calcined powder having a basic composition of SrO.6.0Fe$_2$O$_3$ was produced by calcination at 1200° C. for 2 hours in the air. The calcined powder was coarsely pulverized in a dry state by a roller mill, and then finely pulverized in a wet state by an attritor to produce a slurry containing fine powder of 0.8 μm in average diameter. Co$_3$O$_4$, ZnO and La(OH)$_3$ were added in such amounts as to have a basic composition represented by $(Sr_{1-x}La_x)O.n[(Fe_{1-y}Co_{0.5y}Zn_{0.5y})_2O_3]$, wherein x=0.15, y=x/2n, and n=5.3, at an early stage of the fine pulverization of coarse powder. Also, 0.50 weight % of SrCO$_3$, 0.40 weight % of SiO$_2$ and 0.80% weight of CaCO$_3$ (0.45 weight % as CaO), based on the weight of the coarse powder, were added as sintering aids at an early stage of the fine pulverization of coarse powder. The resultant fine powder slurry was wet-molded in a magnetic field of 10 kOe, and each of the resultant green bodies was sintered at 1210–1230° C. for 2 hours. Each of the resultant sintered bodies was machined to a shape of about 10 mm×10 mm×20 mm to measure magnetic properties at 20° C. by a B-H tracer. The results are shown in Table 4.

EXAMPLE 17

A ferrite magnet was produced in the same manner as in EXAMPLE 16 except for adding La$_2$O$_3$ in place of La(OH)$_3$ at the time of fine pulverization, to measure magnetic properties thereof at 20° C. by a B-H tracer. The results are shown in Table 4.

TABLE 3

| No. | x | Additives Prior-Addition | Additives Post-Addition | Sintering Temp. (° C.) | Br (G) | iHc (Oe) | Hk/iHc (%) |
|---|---|---|---|---|---|---|---|
| Ex. 14 | 0.15 | — | La(OH)$_3$ + Co(OH)$_2$ | 1210 | 4120 | 4285 | 94.8 |
|  |  |  |  | 1220 | 4165 | 4225 | 95.3 |
|  |  |  |  | 1230 | 4200 | 4180 | 96.1 |
| Ex. 15 | 0.15 | — | La$_2$O$_3$ + Co$_3$O$_4$ | 1210 | 4125 | 3875 | 94.7 |
|  |  |  |  | 1220 | 4160 | 3815 | 95.1 |
|  |  |  |  | 1230 | 4190 | 3765 | 95.6 |
| Com. Ex. 6 | 0.15 | La$_2$O$_3$ + Co$_3$O$_4$ | — | 1210 | 4210 | 4395 | 90.6 |
|  |  |  |  | 1220 | 4245 | 4350 | 91.0 |
|  |  |  |  | 1230 | 4270 | 4155 | 92.3 |

Br, iHc and a squareness ratio Hk/iHc in Table 3 were measured at 20° C. It is considered that the value of Hk/iHc is a measure representing not only a squareness ratio of a demagnetization curve, but also the effectiveness of a La element and a Co element substituted to A ion sites and Fe ion sites in the M-type ferrite sintered body.

COMPARATIVE EXAMPLE 7

A ferrite magnet was produced in the same manner as in EXAMPLE 16 except for adding La$_2$O$_3$ in place of La(OH)$_3$ at the time of mixing before calcination, to measure magnetic properties thereof. The results are shown in Table 4.

TABLE 4

| No. | x | Additives Prior-Addition | Additives Post-Addition | Sintering Temp. (° C.) | Br (G) | iHc (Oe) | Hk/iHc (%) |
|---|---|---|---|---|---|---|---|
| Ex. 16 | 0.15 | — | La(OH)$_3$ + Co$_3$O$_4$ + ZnO | 1210 | 4280 | 3150 | 96.6 |
|  |  |  |  | 1220 | 4325 | 3110 | 96.8 |
|  |  |  |  | 1230 | 4380 | 2980 | 97.0 |
| Ex. 17 | 0.15 | — | La$_2$O$_3$ + Co$_3$O$_4$ + ZnO | 1210 | 4270 | 3005 | 95.3 |
|  |  |  |  | 1220 | 4300 | 2985 | 96.1 |
|  |  |  |  | 1230 | 4355 | 2715 | 96.3 |
| Com. Ex. 7 | 0.15 | La$_2$O$_3$ + Co$_3$O$_4$ + ZnO | — | 1210 | 4330 | 3250 | 92.8 |
|  |  |  |  | 1220 | 4335 | 3250 | 93.0 |
|  |  |  |  | 1230 | 4390 | 3020 | 93.5 |

The comparison of EXAMPLES 16 and 17 and COMPARATIVE EXAMPLE 7 in Table 4 indicated that the post-addition of La, Co and Zn served to improve Hk/iHc. It is also clear that La(OH)$_3$ is effective in the case of adding La, Co and Zn.

EXAMPLE 18

SrCO$_3$, Fe$_2$O$_3$, La$_2$O$_3$ and Co$_3$O$_4$ were formulated to provide a basic composition represented by the following formula:

(Sr$_{1-x}$La$_x$)O·n[(Fe$_{1-y}$Co$_y$)$_2$O$_3$], wherein x=0.075, y=x/2n, and n=5.9, wet-mixed, and then calcined at 1200° C. for 2 hours in the air. The calcined powder was coarsely pulverized in a dry state by a roller mill, and then finely pulverized in a wet state by an attritor to produce a slurry containing fine powder of 0.7–0.8 μm in average diameter. Post-added at an early stage of the fine pulverization of each coarse powder were La$_2$O$_3$ and Co$_3$O$_4$ in such amounts as to meet x=0.15, y=x/2n, and n=5.55. Further, 0.50 weight % of SrCO$_3$, 0.80 weight % of CaCO$_3$ and 0.45 weight % of SiO$_2$, based on the weight of the coarse powder, were added as sintering aids at an early stage of the fine pulverization of coarse powder., The resultant fine powder slurry was wet-molded in a magnetic field of 10 kOe, and each of the resultant green bodies was sintered at 1210–1230° C. for 2 hours. Each of the resultant sintered bodies was machined to a shape of about 10 mm×10 mm×20 mm to measure magnetic properties at 20° C. by a B-H tracer. The results are shown in Table 5.

EXAMPLE 19

SrCO$_3$, Fe$_2$O$_3$, La(OH)$_3$ and Co$_3$O$_4$ were formulated to provide a basic composition represented by the following formula:

(Sr$_{1-x}$La$_x$)O·n[(Fe$_{1-y}$Co$_y$)$_2$O$_3$] by atomic ratio, wherein x=0.075, y=x/2n, and n=5.9, wet-mixed, and then calcined at 1200° C. for 2 hours in the air. The calcined powder was coarsely pulverized in a dry state by a roller mill, and then finely pulverized in a wet state by an attritor to produce a slurry containing fine powder of 0.7–0.8 μm in average diameter. Post-added at an early stage of the fine pulverization of each coarse powder were La(OH)$_3$ and Co$_3$O$_4$ in such amounts as to meet x=0.15, y=x/2n, and n=5.55. Further, 0.50 weight % of SrCO$_3$, 0.80 weight % of CaCO$_3$ and 0.45 weight % of SiO$_2$, based on the weight of the coarse powder, were added as sintering aids at an early stage of the fine pulverization of coarse powder. The resultant fine powder slurry was wet-molded in a magnetic field of 10 kOe, and each of the resultant green bodies was sintered at 1210–1230° C. for 2 hours. Each of the resultant sintered bodies was machined to a shape of about 10 mm×10 mm×20 mm to measure magnetic properties at 20° C. by a B-H tracer. The results are shown in Table 5.

TABLE 5

| No. | x | Additives Before Calcination | Additives Post-Addition | Sintering Temp. (° C.) | Br (G) | iHc (Oe) | Hk/iHc (%) |
|---|---|---|---|---|---|---|---|
| Ex. 18 | 0.15 | La$_2$O$_3$ + Co$_3$O$_4$ | La$_2$O$_3$ + Co$_3$O$_4$ | 1210 | 4155 | 4220 | 93.3 |
|  |  |  |  | 1220 | 4180 | 4170 | 93.6 |
|  |  |  |  | 1230 | 4215 | 4025 | 94.5 |
| Ex. 19 | 0.15 | La(OH)$_3$ + Co$_3$O$_4$ | La(OH)$_3$ + Co$_3$O$_4$ | 1210 | 4150 | 4330 | 94.5 |
|  |  |  |  | 1220 | 4195 | 4275 | 95.1 |
|  |  |  |  | 1230 | 4225 | 4180 | 95.7 |

EXAMPLE 20

SrCO$_3$, Fe$_2$O$_3$, Co$_3$O$_4$, ZnO and La$_2$O$_3$ were formulated to provide a basic composition represented by the following formula:

(Sr$_{1-x}$La$_x$)O·n[(Fe$_{1-y}$Co$_{0.5y}$Zn$_{0.5y}$)$_2$O$_3$] by atomic ratio, wherein x=0.075, y=x/2n, and n=6.0, wet-mixed, and then calcined at 1200° C. for 2 hours in the air. The calcined powder was coarsely pulverized in a dry state by a roller mill, and then finely pulverized in a wet state by an attritor to produce a slurry containing fine powder of 0.8 μm in average diameter. Post-added at an early stage of the fine pulverization of each coarse powder were $La_2O_3$, $Co_3O_4$ and ZnO in such amounts as to meet x=0.15, y=x/2n, and n=5.65. Further, 0.50 weight % of $SrCO_3$, 0.40 weight % of $SiO_2$ and 0.80 weight % of $CaCO_3$ (0.45 weight % as CaO), based on the weight of the coarse powder, were added as sintering aids at an early stage of the fine pulverization of coarse powder. The resultant fine powder slurry was wet-molded in a magnetic field of 10 kOe, and each of the resultant green bodies was sintered at 1210–1230° C. for 2 hours. Each of the resultant sintered bodies was machined to a shape of about 10 mm×10 mm×20 mm to measure magnetic properties at 20° C. by a B-H tracer. The results are shown in Table 6.

EXAMPLE 21

$SrCO_3$, $Fe_2O_3$, $Co_3O_4$, ZnO and $La(OH)_3$ were formulated to provide a basic composition represented by the following formula:

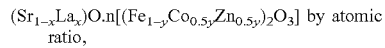 by atomic ratio, wherein x=0.075, y=x/2n, and n=6.0, wet-mixed, and then calcined at 1200° C. for 2 hours in the air. The calcined powder was coarsely pulverized in a dry state by a roller mill, and then finely pulverized in a wet state by an attritor to produce a slurry containing fine powder of 0.8 μm in average diameter. Post-added at an early stage of the fine pulverization of each coarse powder were $La(OH)_3$, $Co_3O_4$ and ZnO in such amounts as to meet x=0.15, y=x/2n, and n=5.65. Further, 0.50 weight % of $SrCO_3$, 0.40 weight % of $SiO_2$ and 0.80 weight % of $CaCO_3$ (0.45 weight % as CaO), based on the weight of the coarse powder, were added as sintering aids at an early stage of the fine pulverization of coarse powder. The resultant fine powder slurry was wet-molded in a magnetic field of 10 kOe, and each of the resultant green bodies was sintered at 1210–1230° C. for 2 hours. Each of the resultant sintered bodies was machined to a shape of about 10 mm×10 mm×20 mm to measure magnetic properties at 20° C. by a B-H tracer. The results are shown in Table 6.

EXAMPLE 22

To measure the temperature characteristics of the ferrite magnets of the present invention, ferrite magnets produced at x=0.15 (EXAMPLE 18) were machined to a predetermined shape as samples. Also, ferrite magnets were produced in the same manner as in EXAMPLE 18 except for changing x to 0, 0.10 and 0.20, respectively, and likewise machined to a predetermined shape as samples. Each sample was set in a vibration-type magnetometer (VSM-3, available from Toei Kogyo K.K.) to measure magnetic properties at temperatures varying every 10° C. from –60° C. to +100° C., thereby determining a temperature coefficient (α) of Br and a temperature coefficient (β) of iHc at –60° C. to +100° C. The results are shown in Table 7.

TABLE 7

| x | α (%/° C.) | β (%/° C.) |
|---|---|---|
| 0 | –0.190 | 0.378 |
| 0.10 | –0.191 | 0.254 |
| 0.15 | –0.192 | 0.196 |
| 0.20 | –0.191 | 0.132 |

It has been found from investigation in connection with the data of Table 7 that the ferrite magnets of the present invention obtained by addition of La and Co have β ranging from 0.13%/° C. to 0.36%/° C. Also, related investigation has revealed that the ferrite magnets of the present invention as shown in Table 7 have Curie temperatures (Tc) in a range of 425° C.<Tc<460° C. in a composition range of $0.01 \leq x \leq 0.4$.

EXAMPLE 23

To measure the temperature characteristics of the ferrite magnets of the present invention obtained by addition of La, Co and Zn, ferrite magnets of EXAMPLE 20 (x=0.15) were machined to a predetermined shape as samples. Each sample was measured with respect to magnetic properties at –60° C. to +100° C. in the same manner as in EXAMPLE 22, thereby determining a temperature coefficient (α) of Br and a temperature coefficient (β) of iHc. The results are shown in Table 8.

TABLE 8

| x | α (%/° C.) | β (%/° C.) |
|---|---|---|
| 0 | –0.190 | 0.378 |
| 0.15 | –0.189 | 0.347 |

TABLE 6

| No. | x | Additives Before Calcination | Additives Post-Addition | Sintering Temp. (° C.) | Br (G) | iHc (Oe) | Hk/iHc (%) |
|---|---|---|---|---|---|---|---|
| Ex. 20 | 0.15 | $La_2O_3$ + $Co_3O_4$ + ZnO | $La_2O_3$ + $Co_3O_4$ + ZnO | 1210 | 4290 | 3085 | 94.5 |
|  |  |  |  | 1220 | 4310 | 3065 | 95.1 |
|  |  |  |  | 1230 | 4365 | 2815 | 95.4 |
| Ex. 21 | 0.15 | $La(OH)_3$ + $Co_3O_4$ + ZnO | $La(OH)_3$ + $Co_3O_4$ + ZnO | 1210 | 4300 | 3185 | 95.7 |
|  |  |  |  | 1220 | 4330 | 3155 | 96.1 |
|  |  |  |  | 1230 | 4385 | 3015 | 96.3 |

The data of Table 8 have revealed that the ferrite magnets of the present invention obtained by addition of La, Co and Zn have β ranging from 0.26%/° C. to 0.36%/° C.

Figure 7:
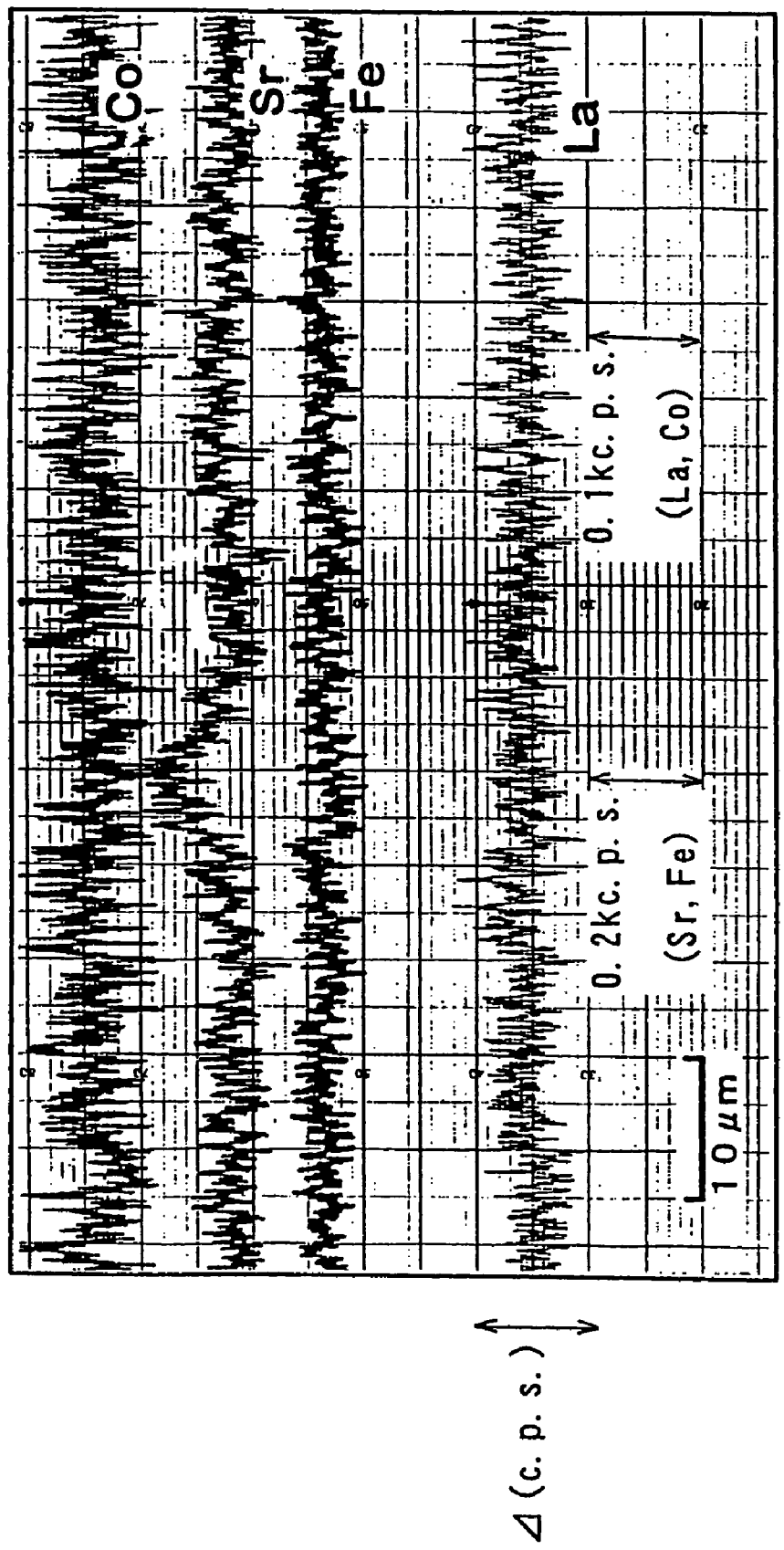
FIG. 7 is a graph showing the results of EPMA analysis of the ferrite magnet produced by the prior-addition method in COMPARATIVE EXAMPLE 4.
Figure 8:
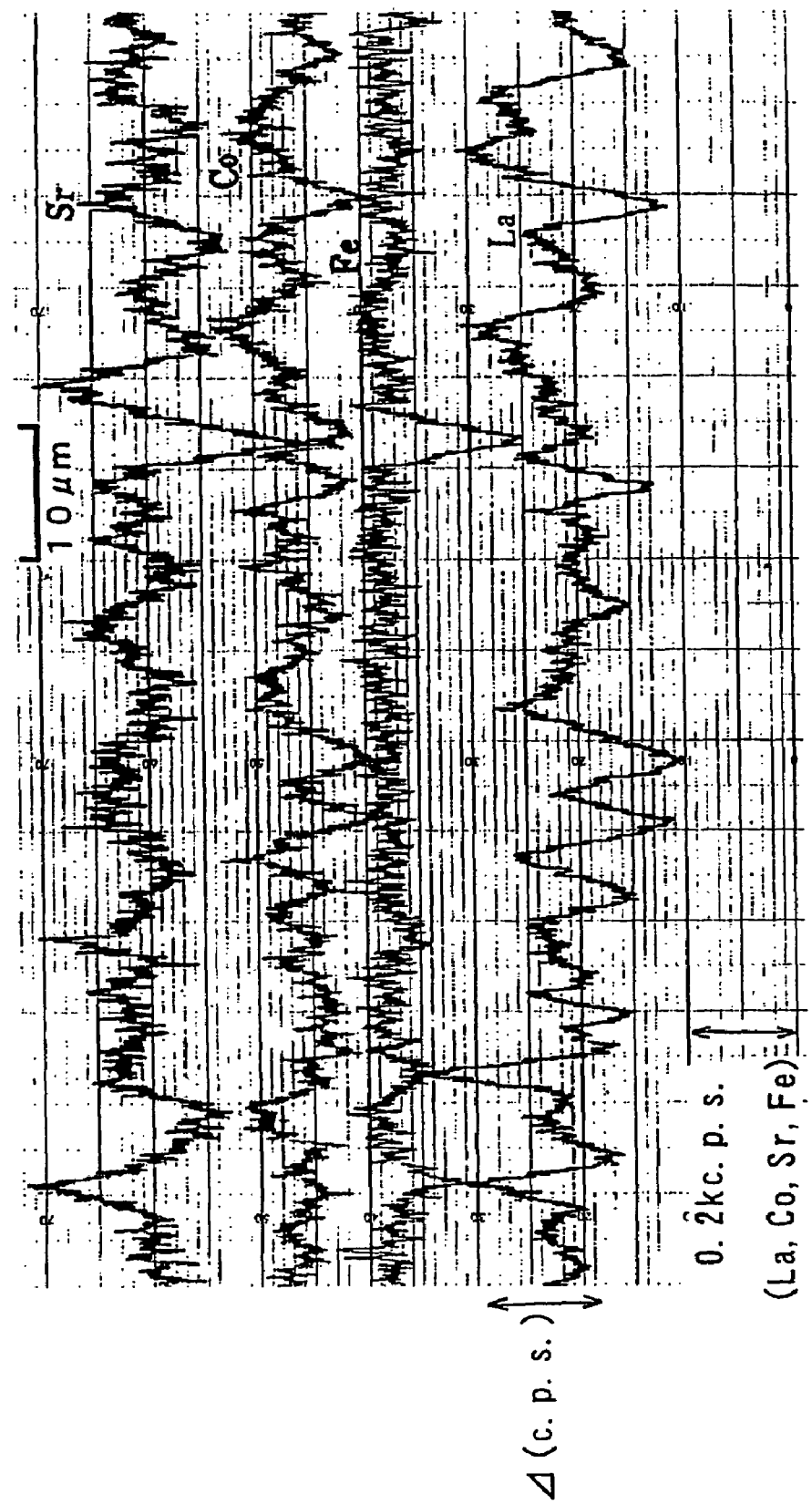
FIG. 8 is a graph showing the results of EPMA analysis of the ferrite magnet produced by the post-addition method in EXAMPLE 1.
Figure 9:
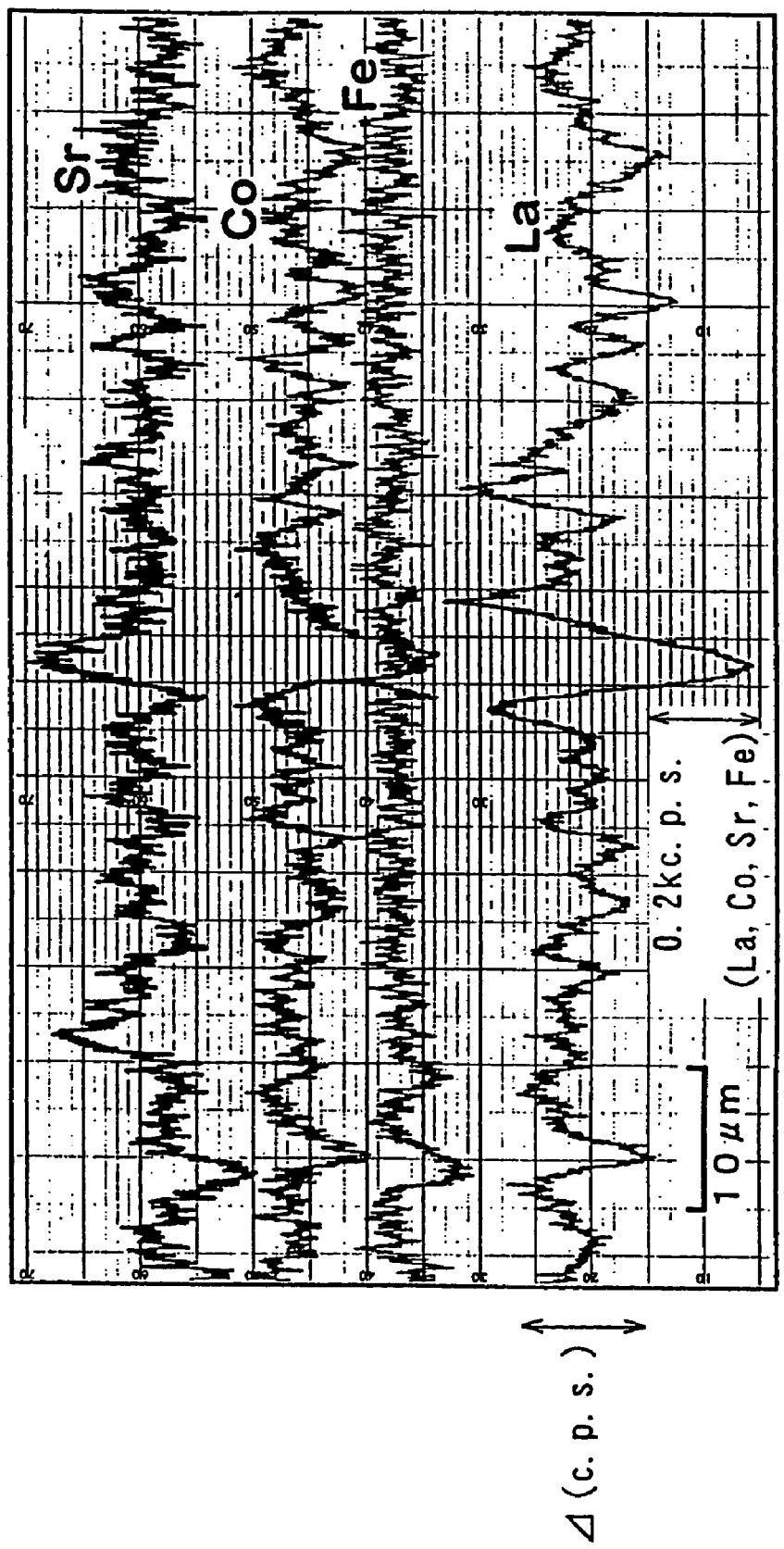
FIG. 9 is a graph showing the results of EPMA analysis of the ferrite magnet produced by the post-addition method in EXAMPLE 2.
Figure 10:
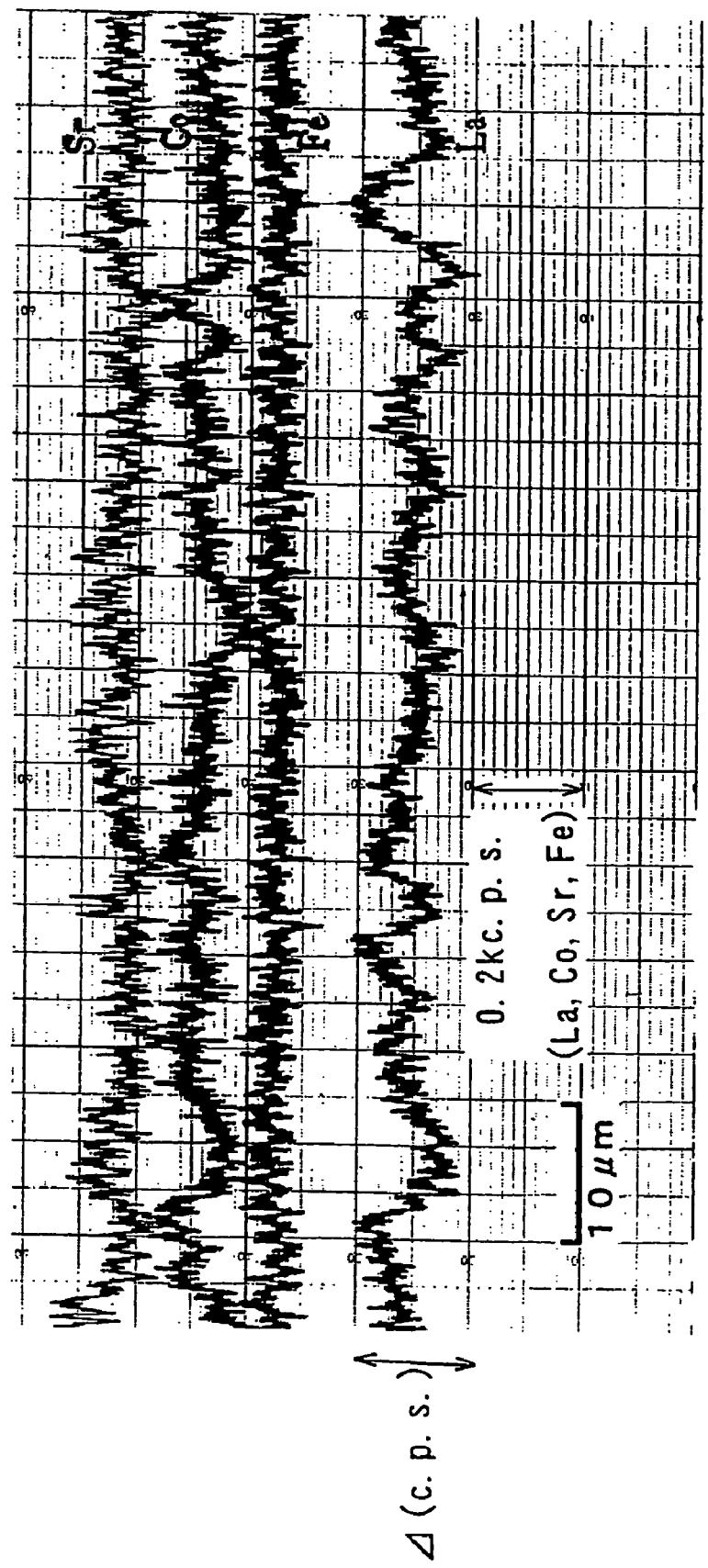
FIG. 10 is a graph showing the results of EPMA analysis of the ferrite magnet produced by the prior/post-addition method in EXAMPLE 10.

FIG. 7 shows the EPMA analysis results of the ferrite magnets of COMPARATIVE EXAMPLE 4 (prior-addition method, x=0.15, and n=5.85). FIG. 8 shows the EPMA analysis results of the ferrite magnets of EXAMPLE 1 (post-addition method, x=0.15, n=5.25, and $Fe_3O_4$=0 weight %). FIG. 9 shows the EPMA analysis results of the ferrite magnets of EXAMPLE 2 (post-addition method, x=0.15, n=5.55, and $Fe_3O_4$=6 weight %). FIG. 10 shows the EPMA analysis results of the ferrite magnets (prior/post-addition method, x=0.20, n=5.90, and $Fe_3O_4$=6 weight %) produced in the same manner as in EXAMPLE 10 except for preparing calcined powder having a basic composition of $(Sr_{1-x}La_x)O.n[(Fe_{1-y}Co_y)_2O_3]$, wherein x=0.10, y=x/2n, and n=6.0, and adding predetermined amounts of $La_2O_3$, $Co_3O_4$ and $Fe_3O_4$ at the time of fine pulverization.

Each sample for EPMA analysis as shown in FIGS. 7–10 was embedded in a resin such that a c surface of the ferrite magnet appeared on a surface of the resin, and mirror-polished for EPMA line analysis with $Al_2O_3$ abrasive powder having a particle size of 0.05 µm. Used as an EPMA apparatus was an electron probe micro-analyzer (EPM-810Q, available from Shimadzu Corp.). The measurement conditions were an acceleration voltage of 15 kV, an acceleration current of 0.1 µA, and an irradiation beam diameter of 1 µm. In FIGS. 7–10, the axis of ordinates represents the counts per second (c.p.s.) of each element of La, Co, Sr and Fe, and the axis of abscissas represents a scanning distance (µm). FIGS. 7–10 show scales for the c.p.s. and the scanning distance. Spectroscopic crystals used in the EPMA apparatus were lithium fluoride (LiF) for the line analysis of La, pentaerythritol [PET, $C(CH_2OH)_4$] for the line analysis of Sr, rubidium acidic phthalate [(RAP, $C_6H_4(COOH)(CO-ORb)$] for the line analysis of Fe, and LiF for the line analysis of Co.

As shown in FIGS. 7–10, variations of the c.p.s. of La read on the EPMA results in an arbitrary 80-µm range on a surface of each sample was defined as Δ(c.p.s.). In FIG. 7 (prior-addition method, x=0.15, and n=5.85), Δ(c.p.s.)=0.119 kc.p.s. In FIG. 8 (post-addition method, x=0.15, n=5.25, and $Fe_3O_4$=0 weight %), Δ(c.p.s.)=0.512 kc.p.s. In FIG. 9 (post-addition method, x=0.15, n=5.55, and $Fe_3O_4$=6 weight %), Δ(c.p.s.)=0.557 kc.p.s. In FIG. 10 (prior/post-addition method, x=0.20, n=5.90, and $Fe_3O_4$=6 weight %), Δ(c.p.s.)=0.252 kc.p.s.

It is clear from investigation in connection with FIG. 7 that the prior-addition method provides Δ(c.p.s.)=0.07–0.15 kc.p.s., suggesting that La is distributed more uniformly by the prior-addition method than the post-addition method in FIGS. 8 and 9 and the prior/post-addition method in FIG. 10. The investigation of FIGS. 8 and 9 has revealed that the post-addition method provides Δ(c.p.s.)=0.35–0.65, suggesting that the distribution of La is the most non-uniform. Further, FIGS. 8 and 9 have revealed the tendency that the addition of $Fe_3O_4$ slightly contributes to increase in Δ(c.p.s.). Next, FIG. 10 has revealed that in the prior/post-addition method in which the contribution of the post-addition to the value of x and/or y is 20% or more and less than 100%, Δ(c.p.s.) is 0.15–0.35, suggesting that the distribution of La is between that of the post-addition method and that of the prior/post-addition method.

Figure 11:
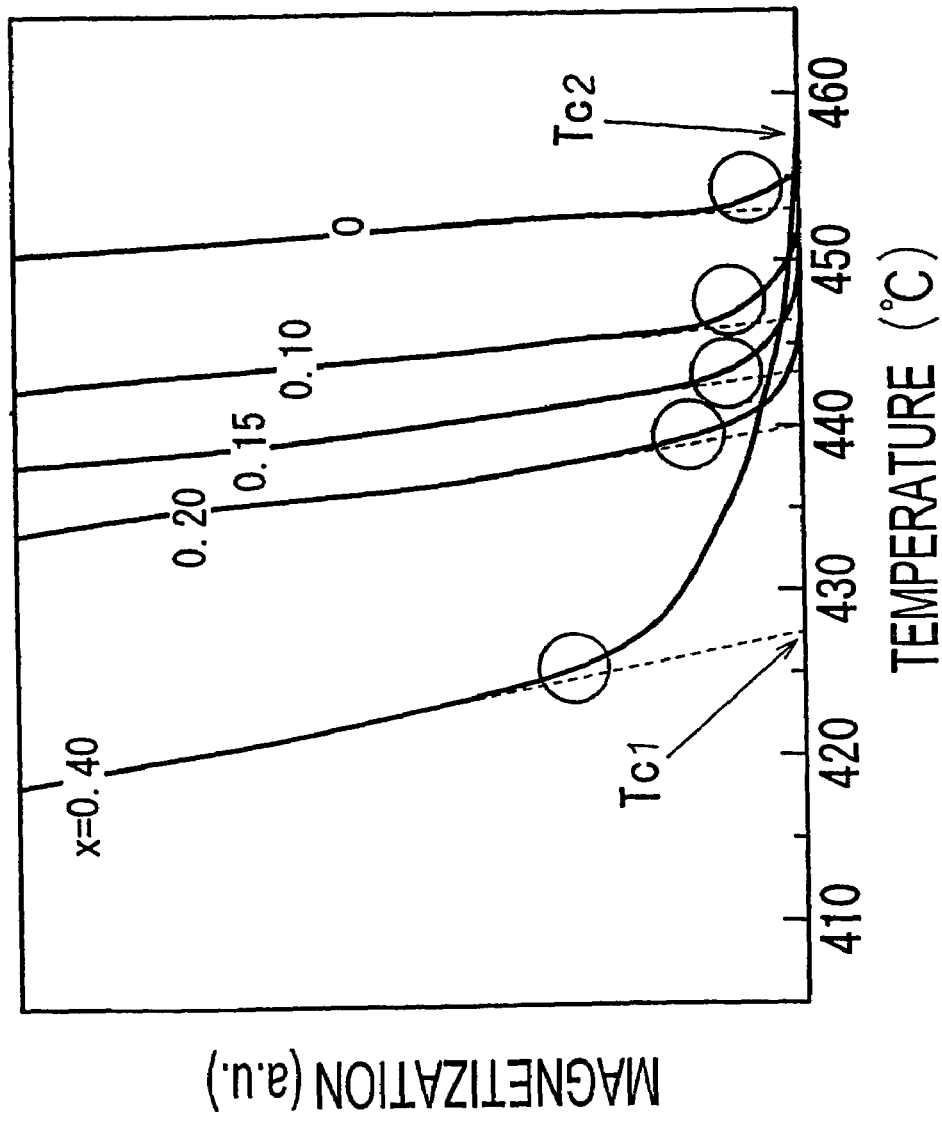
FIG. 11 is a graph showing the magnetization-temperature curves of the ferrite magnets produced by the prior-addition method.

FIG. 11 shows the magnetization-temperature curves of the ferrite magnets produced by the prior-addition method, each of which has a basic composition represented by $(Sr_{1-x}La_x)O.n[(Fe_{1-y}Co_y)_2O_3]$ by atomic ratio, wherein x=0.10–0.40, y=x/2n, and n=5.9. The axis of ordinates represents magnetization (relative value). x=0 represents a ferrite magnet having a conventional composition of $SrO.5.9Fe_2O_3$.

An intersection of a tangent (broken line) of each curve and the axis of abscissas (magnetization=0) is defined as the first Curie temperature ($Tc_1$), and an intersection of each curve and the axis of abscissas (magnetization=0) is defined as the second Curie temperature ($Tc_2$). FIG. 11 shows that in the magnetization-temperature curves of the ferrite magnets of x=0–0.40 produced by the prior-addition method, curve portions encircled by ○ are convexly curved relative to the tangent (broken line) extending through $Tc_1$.

Figure 12:
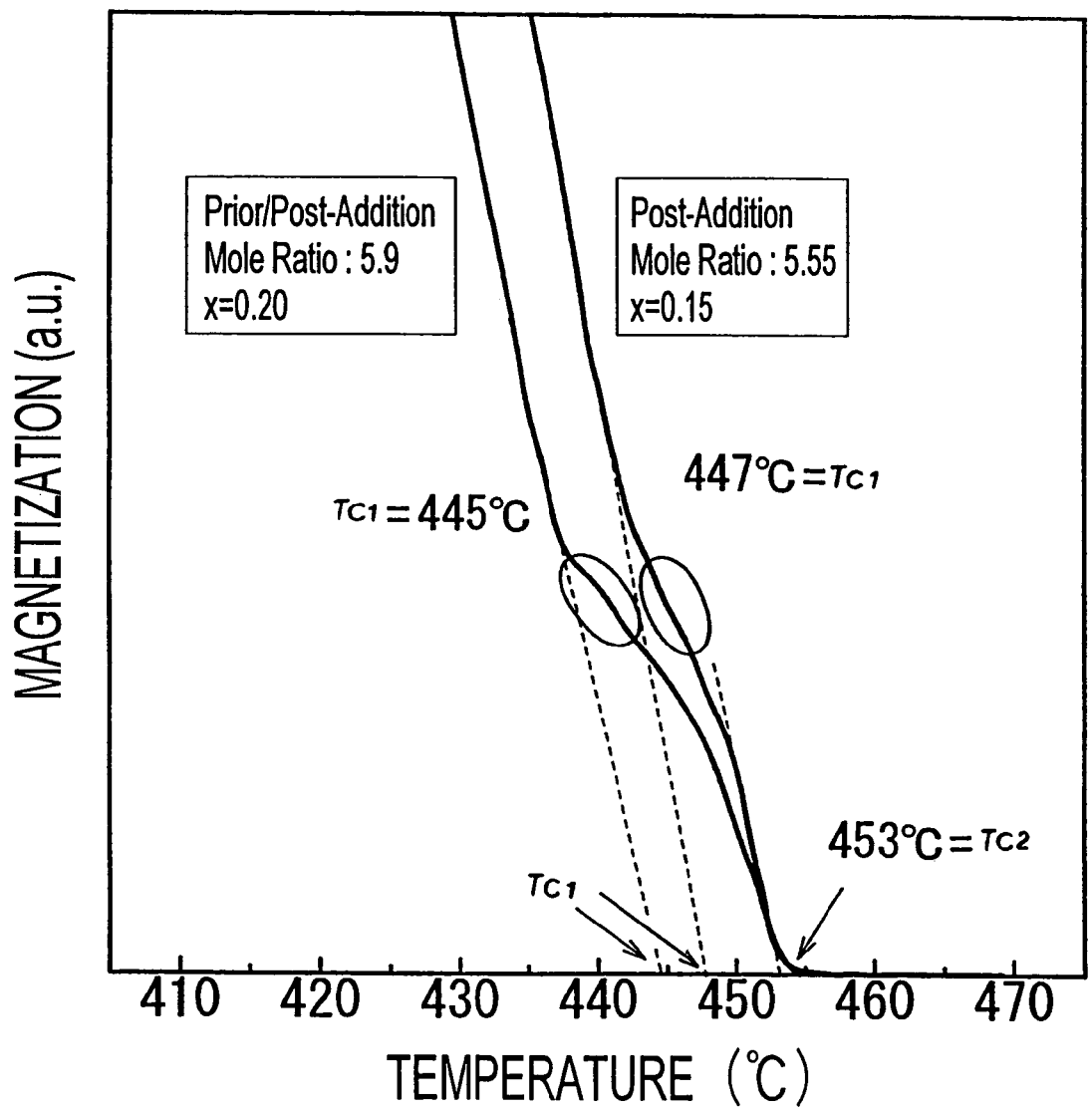
FIG. 12 is a graph showing the magnetization-temperature curves of the ferrite magnets produced by the post addition method and the prior/post-addition method.

FIG. 12 shows magnetization-temperature curves obtained by measurement of samples cut away from the same ferrite magnets as in FIG. 9 (post-addition method, x=0.15, n=5.55, and $Fe_3O_4$=6 weight %). FIG. 12 further shows magnetization-temperature curves obtained by measurement of samples cut away from the same ferrite magnets as in FIG. 10 (prior/post-addition method, x=0.20, n=5.90, and $Fe_3O_4$=6 weight %). In the case of those obtained by the post-addition method shown in FIG. 12, $Tc_1$=447° C., and $Tc_2$=453° C., curve portions encircled by ○ being concavely curved relative to the tangent (broken line) extending through $Tc_1$. In the case of those obtained by the prior/post-addition method shown in FIG. 12, $Tc_1$=445° C., and $Tc_2$=453° C., curve portions encircled by ○ being concavely curved relative to the tangent (broken line) extending through $Tc_1$.

EXAMPLE 24

Figure 13:
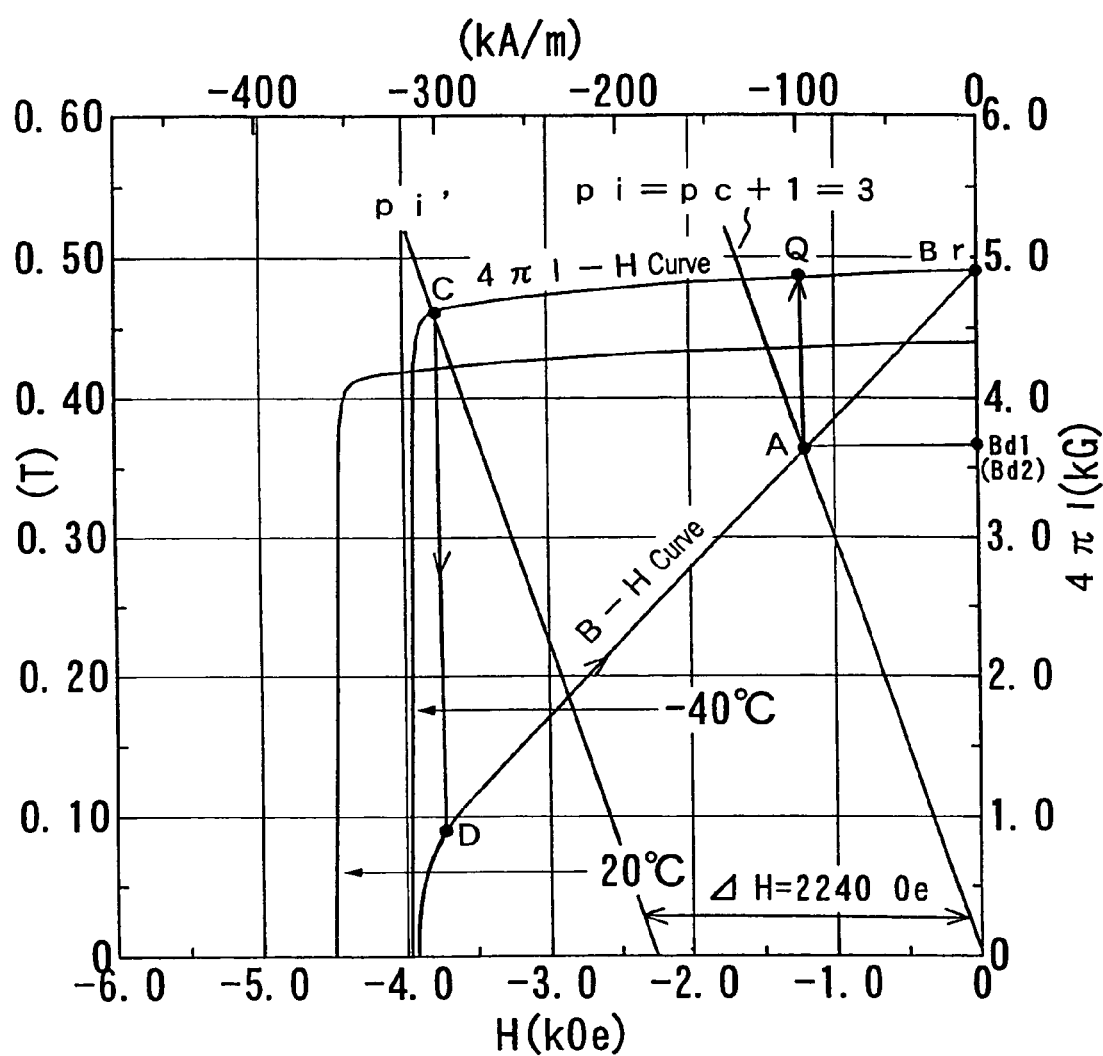
FIG. 13 is a graph showing the correlation between a squareness ratio and resistance to demagnetization in the ferrite magnet produced by the post-addition method in EXAMPLE 24.

A ferrite magnet having the following basic composition:

$(Sr_{1-x}La_x)O.n[(Fe_{1-y}Co_y)_2O_3]$ by atomic ratio, wherein x=0.15, y=x/2n, and n=5.55, was produced by a post-addition method in the same manner as in EXAMPLE 2 except for using calcined powder having a basic composition of $SrO.5.9Fe_2O_3$, adjusting an average diameter of fine powder to 0.65 µm, and adding 7 weight % of $Fe_3O_4$ at the time of fine pulverization. 4πI-H curves of this ferrite magnet at 20° C. and −40° C., respectively, are shown in FIG. 13. By utilizing the post-addition method with a desired amount of $Fe_3O_4$ added, and adjusting the average diameter of fine powder to a level of 0.4–0.65 µm suitable for high Br, extremely high Br, iHc and squareness ratio Hk/iHc, specifically Br of 4.4 kG, iHc of 4.5 kOe and a squareness ratio Hk/iHc of 95% at 20° C., have been realized.

The measurement results of a critical demagnetizing field intensity (ΔH) of this high-performance ferrite magnet at −40° C. will be explained below. In FIG. 13, an operation line pi determined by a magnetic circuit comprising a ferrite magnet has an operation point at a point A on the B-H curve, and the operation point A corresponds to a point Q on the 4πI-H curve. By measurements under the condition of pi=pc+1=3, wherein pi represents a permeance coefficient on the 4πI-H curve, and pc represents a permeance coefficient on the B-H curve, ΔH was 2240 Oe as shown in FIG. 13. pi' is an operation line parallel with the operation line pi. Under the conditions of −40° C., and pi=pc+1=3, a magnetic flux density at the operation point A before application of ΔH is $Bd_1$. When ΔH of 2240 Oe is applied, the operation point moves to a point D on the B-H curve corresponding to the intersection C of the operation line pi' and the 4πI-H curve. After removal of a demagnetizing field, the operation point substantially returns to the point A at ΔH=0. Thus, the magnetic flux density ($Bd_1$)=3650 G at the point A before application of ΔH is substantially equal to the magnetic flux density ($Bd_2$) at the operation point after application and removal of ΔH, which returns to the point A. Accordingly, the irreversible loss of magnetic flux defined by $[(Bd_1-Bd_2)/Bd_1]\times 100\%$ is substantially 0%.

COMPARATIVE EXAMPLE 8

Figure 14:
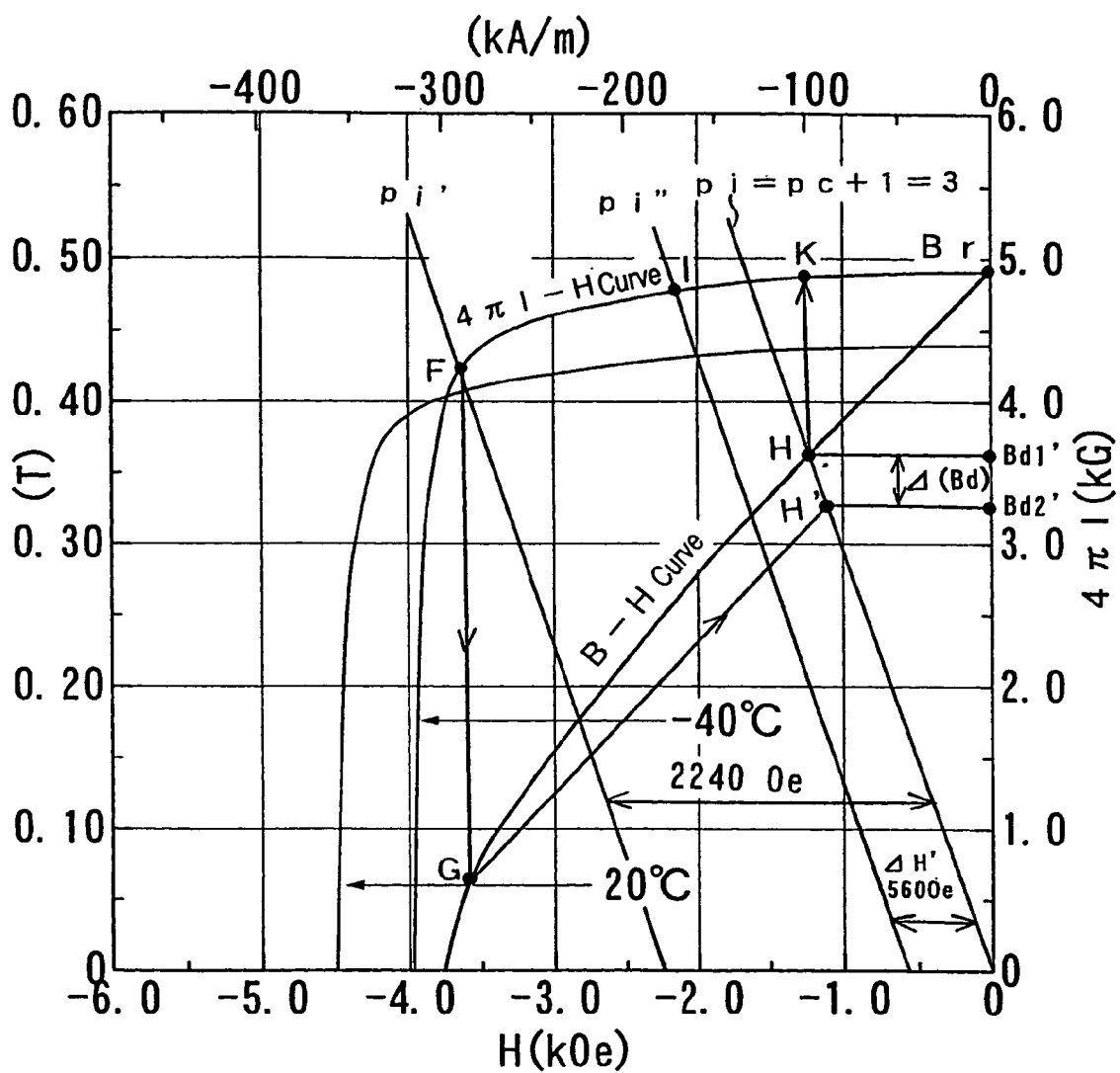
FIG. 14 is a graph showing the correlation between a squareness ratio and resistance to demagnetization in the ferrite magnet produced by the prior-addition method in COMPARATIVE EXAMPLE 8.

A ferrite magnet was produced in the same manner as in COMPARATIVE EXAMPLE 4 except for formulating starting materials by a prior-addition method to have the following basic composition:

$(Sr_{1-x}La_x)O \cdot n[(Fe_{1-y}Co_y)_2O_3]$ by atomic ratio, wherein x=0.15, y=x/2n, and n=5.85. $4\pi$I-H curves of this ferrite magnet at +20° C. and −40° C., respectively, are shown in FIG. 14. Because this ferrite magnet was produced by the prior-addition method, a squareness ratio Hk/iHc was as low as 76% at 20° C., though Br and iHc were as high as 4.4 kG and 4.5 kOe, respectively, at 20° C.

FIG. 14 shows the measurement results of a critical demagnetizing field intensity ($\Delta H'$) of this ferrite magnet with a poor squareness ratio in the same manner as in FIG. 13 at −40° C. In FIG. 14, an operation line pi determined by a magnetic circuit comprising a ferrite magnet has an operation point at a point H on the B-H curve, and the operation point H corresponds to a point K on the $4\pi$I-H curve. pi' and pi" are operation lines parallel with the operation line pi. As shown in FIG. 14, a critical magnetic field intensity ($\Delta H'$) at which demagnetization does not take place under the conditions of −40° C. and pi=3 is 560 Oe (25% relative to $\Delta H$ in FIG. 13).

Next, an irreversible loss of magnetic flux was measured after application and removal of a demagnetizing field of 2240 Oe in the same manner as in FIG. 13. When the demagnetizing field of 2240 Oe is applied under the conditions of −40° C. and pi=3, the operation point moves to a point G on the B-H curve corresponding to the intersection F of the operation line pi' and the $4\pi$I-H curve. After removal of a demagnetizing field of 2240 Oe, the operation point substantially returns to the point H', at which the magnetic flux density ($Bd_2'$) is 3240 G. Since the magnetic flux density ($Bd_1'$) at the operation point H is 3640 G before application of the demagnetizing field of 2240 Oe, the irreversible loss of magnetic flux is [(3640−3240)/3640]×100%=11.0%, suggesting a larger loss of magnetic flux than in FIG. 13.

Investigation of FIGS. 13 and 14 has revealed that in the case of the ferrite magnet of the present invention (R=La, and M=Co) having Br of 4100 G or more, iHc of 4000 Oe or more and Hk/iHc of 92.3% or more, $\Delta H$ may be preferably 1000 Oe or more, more preferably 1500 Oe or more, particularly preferably 2000 Oe or more under the conditions of 40° C. and pi$\geq$3. This ferrite magnet is suitable for solid, cylindrical magnets or ring-shaped magnets with radial or polar anisotropy capable of being magnetized symmetrically or unsymmetrically with 4–24 magnetic poles, more preferably 4–16 magnetic poles. The solid, cylindrical magnet or the ring-shaped magnet may be constituted by an integral ferrite magnet or a plurality of ferrite magnet pieces bonded together. Such integral or combined ferrite magnets can constitute, for instance, long magnet rolls for photocopiers. The present invention greatly contributes to improvement in performance and miniaturization of rotors, photocopiers, etc.

In the ferrite magnet of the present invention (R=La, and M=Co+Zn and/or Mn) having Br of 4200 G or more, iHc of 3000 Oe or more and Hk/iHc of 93.5% or more at 20° C., too, $\Delta H$ can be greatly improved with irreversible loss of magnetic flux suppressed.

Though the above EXAMPLES are related to Sr ferrite whose R and M elements are substituted, it should be noted that Ba ferrite and Sr—Ba ferrite, whose R and M elements are substituted, also substantially have a magnetoplumbite crystal structure showing higher coercivity iHc (or higher coercivity iHc and residual magnetic flux density Br) than those of conventional ferrite magnets.

Compounds effective for improving magnetic properties such as $B_2O_3$, Bi compounds, etc., other than $SiO_2$ and CaO, may be added to the ferrite magnet of the present invention having a magnetoplumbite-type crystal structure. Also, the ferrite magnet of the present invention may contain less than predetermined amounts of inevitable impurities, in addition to the above indispensable components.

APPLICATIONS IN INDUSTRY

Because the ferrite magnet of the present invention is produced by the post-addition method and/or the prior/post-addition method in which the molar ratio n can freely be controlled, not only has it a microstructure in which the concentrations of rare earth elements are high in crystal grain boundaries, but also is it easily mass-produced. Thus, the ferrite magnet of the present invention has higher coercivity iHc (or higher coercivity iHc and residual magnetic flux density Br), higher squareness ratio Hk/iHc and smaller variation of a shrinkage ratio than those of conventional ferrite magnets.

The ferrite magnets having such characteristics according to the present invention are extremely useful for various rotors, actuators, etc. required to have high Br and iHc. The Co content of less than 10 atomic % extremely reduces iHc, while the Co content exceeding 95 atomic % substantially nullifies the effects of adding Zn.

The ferrite magnet according to one embodiment of the present invention has higher iHc than that of conventional ferrite magnets, while keeping Br equal to or higher than that of the conventional ferrite magnets. Therefore, such ferrite magnet of the present invention is expected to be used for motors for ABS, starters, etc.

The ferrite magnet according to another embodiment of the present invention has higher Br than that of conventional ferrite magnets, while keeping iHc equal to or higher than that of the conventional ferrite magnets. Therefore, such ferrite magnet of the present invention is expected to be used for motors for compressors of air conditioners, etc.

What is claimed is:

1. A method for producing an anisotropic, sintered ferrite magnet having a basic composition represented by the following general formula:

$(A_{1-x}R_x)O \cdot n[(Fe_{1-y}M_y)_2O_3]$ by atomic ratio, wherein A is Sr or (Sr+Ba), R is at least one rare earth element including Y, the M element is Co, and x, y and n are numbers meeting the following conditions:

$0.01 \leq x \leq 0.4$, $0.005 \leq y \leq 0.04$, and $5 \leq n \leq 6$, said anisotropic, sintered ferrite magnet having a magnetoplumbite crystal structure, and a magnetization-temperature curve of said anisotropic, sintered ferrite magnet having a concavely curved portion relative to a tangent on said magnetization-temperature curve when said tangent is drawn on said magnetization-temperature curve in the direction of the axis of abscissas (magnetization=0), said method comprising the steps of adding a compound of the R element and/or the M element at a step of uniformly mixing a compound of Sr or (Sr+Ba) with an iron compound; calcining the resultant mixture; adding the remaining amount of said compound of the R element and/or the M element to the resultant calcined powder at a pulverization step thereof to form a finely pulverized powder; molding the resultant finely pulverized powder in a magnetic field; and sintering the resultant green body, wherein R is added as a hydroxide or R, and wherein said finely pulverized powder is finely pulverized in a wet state and an average diameter of said finely pulverized powder is 0.7–0.9 μm.

2. The method for producing an anisotropic, sintered ferrite magnet, according to claim 1, wherein said anisotropic, sintered ferrite magnet has a critical demagnetizing field intensity (ΔH) thereof 1000 Oe or more in a $4\pi$ I(unit:kG)-H(unit:kOe) demagnetization curve under the conditions of −40° C. and a penneance coefficient pi≦3.

3. The method for producing an anisotropic, sintered ferrite magnet according to claim 1 or 2, wherein an iron compound is further added at the pulverization step after the calcination.

4. A method for producing an anisotropic, sintered ferrite magnet, having a basic composition represented by the following general formula:

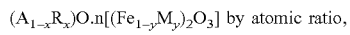

$(A_{1-x}R_x)O \cdot n[(Fe_{1-y}M_y)_2O_3]$ by atomic ratio, wherein A is Sr or (Sr+Ba), R is at least one rare earth element including Y, the M element is Co, and x, y and n are numbers meeting the following conditions:

$0.01 \leq x \leq 0.4$, $0.005 \leq y \leq 0.04$, and $5 \leq n \leq 6$, said anisotropic, sintered ferrite magnet having a magnetoplumbite ciytai structure, and a magnetization-temperature curve of said anisotropic, sintered ferrite magnet having a concavely curved portion relative to a tangent on said magnetization-temperature curve wnen said tangent is drawn on said magnetization-temperature curve in the direction of the axis of abscissas (magnetization=0), said method comprising the steps of adding a compound of the R element and/or the M element at a step of uniformly mixing a compound of Sr or (Sr+Ba) with an iron compound; calcining the resultant mixture; adding the remaining amount of said compound of the R element and/or the M element to the resultant calcined powder at a pulverization step thereof to form a finely pulverized powder; molding the resultant finely pulverized powder in a magnetic field; and sintering the resultant green body, wherein said finely pulverized powder is finely pulverized in a wet state and an average diameter of said finely pulverized powder is 0.7–0.9 μm, and wherein a spinel ferrite compound containing at least one of Co, Zn and Mn is added at a pulverization step after the calcination to suppress decrease the molar ratio n.

* * * * *

UNITED STATES PATENT AND TRADEMARK OFFICE
CERTIFICATE OF CORRECTION

PATENT NO. : 7,169,319 B2
APPLICATION NO. : 10/963832
DATED : January 30, 2007
INVENTOR(S) : Takashi Takami, Yutaka Kubota and Yasunobu Ogata It is certified that error appears in the above-identified patent and that said Letters Patent is hereby corrected as shown below:

Claim 1, line 21, which is at col. 33, line 9, delete "Sror" and insert --Sr or--.
Claim 1, line 29, which is at col. 33, line 17, delete "or R," and insert --of R--.
Claim 2, line 2, which is at col. 33, line 21, delete "magnet," and insert --magnet--.
Claim 2, line 6, which is at col. 33, line 25, delete "a pennenance coefficient $pi \leq 3$" and insert "a pennenance coefficient $pi \geq 3$--.
Claim 3, line 4, which is at col. 33, line 27, delete "magnet," and insert --magnet--.
Claim 4, line 2, which is at col. 4, line 10, delete "ciytai" and insert --crystal--.

Signed and Sealed this

Third Day of August, 2010

David J. Kappos
*Director of the United States Patent and Trademark Office*